United States Patent
Kim et al.

(10) Patent No.: US 10,110,979 B2
(45) Date of Patent: Oct. 23, 2018

(54) PASSIVE OPTICAL NETWORK RECEIVING AND TRANSMITTING FRAME USING MULTIPLE LANES

(71) Applicant: ELECTRONICS AND TELECOMMUNICATIONS RESEARCH INSTITUTE, Daejeon (KR)

(72) Inventors: Kwang Ok Kim, Jeonju-si (KR); Kyeong Hwan Doo, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/398,841

(22) Filed: Jan. 5, 2017

(65) Prior Publication Data
US 2018/0035183 A1    Feb. 1, 2018

(30) Foreign Application Priority Data
Jul. 26, 2016    (KR) .................. 10-2016-0095044

(51) Int. Cl.
*H04Q 11/00*    (2006.01)
(52) U.S. Cl.
CPC . *H04Q 11/0067* (2013.01); *H04Q 2011/0064* (2013.01); *H04Q 2011/0088* (2013.01)
(58) Field of Classification Search
CPC .. H04L 29/06149–29/06163; H04L 29/06068; G06F 13/382–13/387; H04Q 11/0067; H04Q 2011/0064; H04Q 2011/0088
USPC .................. 370/465–467, 535–543
See application file for complete search history.

(56) References Cited

U.S. PATENT DOCUMENTS

| | | | |
|---|---|---|---|
| 2004/0151195 A1* | 8/2004 | Donoghue | H04L 49/1515 370/412 |
| 2007/0133800 A1 | 6/2007 | Kim et al. | |
| 2009/0052894 A1 | 2/2009 | Murata | |
| 2010/0177785 A1* | 7/2010 | Kisaka | H04J 3/1664 370/465 |
| 2011/0020001 A1 | 1/2011 | Kim et al. | |

(Continued)

FOREIGN PATENT DOCUMENTS

JP    2006-197489 A    7/2006

OTHER PUBLICATIONS https://www.thefreedictionary.com/bypass.*
(Continued)

*Primary Examiner* — David Payne
*Assistant Examiner* — Casey Kretzer
(74) *Attorney, Agent, or Firm* — LRK Patent Law Firm

(57) ABSTRACT

A method of registering an optical network unit (ONU) in an optical line terminal (OLT). The OLT determines a lane to be used by the ONU based on a transmission rate supported by the ONU, combines or distributes data of a dataflow based on a rate of the lane by comparing the rate of the lane to a rate of the dataflow of a media access control (MAC) client interface, and, when the OLT and the ONU are connected through multiple lanes, transmits and receives data between the OLT and the ONU through channel bonding for more effective use of a network.

10 Claims, 28 Drawing Sheets

(56) References Cited

U.S. PATENT DOCUMENTS

2014/0212128 A1* 7/2014 Hirth .................. H04J 3/1694
398/1
2017/0244487 A1* 8/2017 Gao ..................... H04B 10/27

OTHER PUBLICATIONS

Glen Kramer, "Flexible and Extensible Architecture for Multiple Generations of NG-EPON", IEEE P802.3ca Task Force meeting, Macao, China, Mar. 2016.

* cited by examiner

FIG. 24

| Bit | Flag field | Value |
|---|---|---|
| 0 | Lane 0 assign | 0-Lane 0 is not enabled<br>1-Lane 0 is enabled |
| 1 | Lane 1 assign | 0-Lane 1 is not enabled<br>1-Lane 1 is enabled |
| 2 | Lane 2 assign | 0-Lane 2 is not enabled<br>1-Lane 2 is enabled |
| 3 | Lane 3 assign | 0-Lane 3 is not enabled<br>1-Lane 3 is enabled |
| 4:15 | Reserved | Ignored on reception |

2410

| Size | Field |
|---|---|
| 6 | Destination address |
| 6 | Source address |
| 2 | Length/type=0x8808 |
| 2 | Opcode=0x0005 |
| 4 | Timestamp |
| 2 | Assigned port |
| 1 | Flag |
| 2 | Sync time |
| 1 | Echoed pending grants |
| 1 | Laser on time |
| 1 | Laser off time |
| 2 | Lane assign |
| 30 | Pad/reserved |
| 4 | FCS |

2420

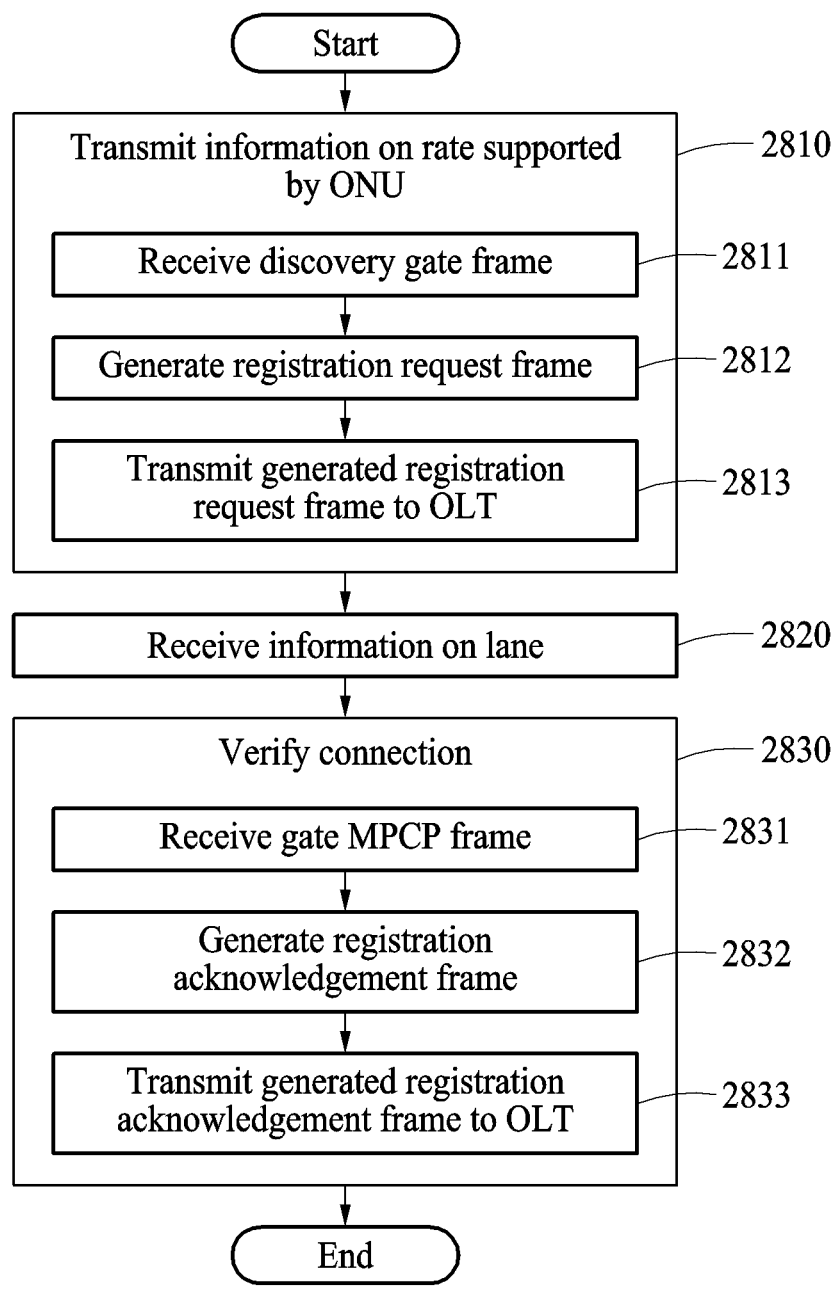

PASSIVE OPTICAL NETWORK RECEIVING AND TRANSMITTING FRAME USING MULTIPLE LANES

CROSS-REFERENCE TO RELATED APPLICATION(S)

This application claims the priority benefit of Korean Patent Application No. 10-2016-0095044, filed on Jul. 26, 2016, in the Korean Intellectual Property Office, the disclosure of which is incorporated herein by reference for all purposes.

BACKGROUND

1. Field

One or more example embodiments relate to a passive optical network (PON), and more particularly, to a PON that may transmit a frame using multiple lanes.

2. Description of Related Art

Passive optical network (PON) technology may be classified into a time-division multiplexing (TDM)-PON method of dividing a time to provide a service and a wavelength-division multiplexing (WDM)-PON method of dividing a wavelength to provide a service, based on a transmission method.

A PON using the TDM-PON method may be classified into an Ethernet PON (EPON) and a gigabit-capable PON (GPON) based on a transmission protocol. The TDM-PON method may transfer, in a point-to-multipoint link structure, data downwards through broadcasting and upwards through TDM.

The EPON is a PON standardized by the Institute of Electrical and Electronics Engineers (IEEE) 802.3 working group, and is classified into a 1 gigabit per second (Gb/s) EPON (1G-EPON) and a 10G-EPON based on a transmission rate supported by a terminal included in the EPON. The 1G-EPON and the 10G-EPON may provide a service through a single wavelength.

The GPON is a PON standardized by the International Telecommunication Union (ITU)'s Telecommunication Standardization Sector (ITU-T) study group 15 Q2 (ITU-T SG15 Q2), and is classified into a GPON capable of a 2.5 Gb/s transmission and an XG-PON capable of a 10 Gb/s transmission. Recently, to provide a transmission rate of 40 Gb/s, the GPON uses four WDM wavelengths, and an optical network unit (ONU) includes a time and wavelength division multiplexed (TWDM)-PON that provides a service by selecting a single wavelength from the four WDM wavelengths. Thus, in a PON standardized up to the present, an ONU may receive a service through a single lane or wavelength.

The IEEE 802.3 working group has been working on a 100G-EPON standardization since July, 2015, to develop a PON that supports a transmission rate of 100 Gb/s or higher. An ONU that supports 100G-EPON may provide a high-speed PON service through one or more lane or wavelength, and provide a 100 Gb/s transmission through channel bonding. The 100G-EPON for which standardization is currently underway may require a 100 Gb/s client service interface to support the channel bonding. In addition, the 100G-EPON may request that an optical line terminal (OLT) discovers and registers a 25 Gb/s ONU using only a single lane.

The 100G-EPON may accommodate various client service interfaces. However, to accommodate a 100 Gb/s client service interface, the 100G-EPON may request that an OLT and an ONU include a switch supporting a transmission rate of 100 Gb/s. Further, the OLT may provide a service to a 25 Gb/s ONU using only a single lane.

SUMMARY

An aspect provides a method of transmitting a dataflow through multiple lanes and providing a service based on a transmission rate supported by an optical network unit (ONU) and on whether channel bonding is supported, in order to support various client service interfaces in a 100 gigabit per second (Gb/s) Ethernet passive optical network (100G-EPON).

Another aspect provides a method of registering an ONU to be performed for each lane of an optical line terminal (OLT), and a method of assigning a lane to an ONU based on a transmission rate supported by the ONU and on whether channel bonding is supported.

According to an aspect, there is provided a method of processing a downstream dataflow to be performed by an OLT, the method including identifying a first transmission rate of at least one downstream dataflow transmitted through a media access control (MAC) client interface, bypassing a MAC bridge for the downstream dataflow in response to the first transmission rate being equal to a second transmission rate of multiple lanes of the OLT, combining the downstream dataflow based on the second transmission rate through the MAC bridge in response to the first transmission rate being less than the second transmission rate, distributing the downstream dataflow based on the second transmission rate through a channel binder in response to the first transmission rate being greater than the second transmission rate, and outputting, through of the multiple lanes, the downstream dataflow transmitted from the MAC bridge or the channel binder.

The method may further include receiving, through the lanes, MAC frames output from an ONU, bypassing the MAC bridge for the MAC frames in response to the first transmission rate of the downstream dataflow corresponding to the MAC frames being equal to the second transmission rate, distributing the MAC frames through the MAC bridge in response to the first transmission rate of the downstream dataflow corresponding to the MAC frames being less than the second transmission rate, combining the MAC frames through the channel binder in response to the first transmission rate of the downstream dataflow corresponding to the MAC frames being greater than the second transmission rate, and outputting, through an upstream dataflow, the MAC frames transmitted from the MAC bridge or the channel binder.

The distributing of the MAC frames may include determining the upstream dataflow to which each of the MAC frames is to be distributed in order not to exceed a transmission rate of the upstream dataflow that is equal to the first transmission rate, and distributing the MAC frames through the determined upstream dataflow.

The combining of the MAC frames may include transmitting the MAC frames to a combiner of the channel binder based on a timeslot sequence of the MAC frames stored in a frame buffer corresponding to each of the lanes, and combining the MAC frames through the combiner of the channel binder.

The combining of the downstream dataflow may include determining a lane to which the downstream dataflow is to be distributed among the lanes based on a destination address, and combining the downstream dataflow based on the determined lane in order not to exceed the second transmission rate.

The distributing of the downstream dataflow may include determining a frame buffer to which the downstream dataflow is to be distributed based on respective capacities of frame buffers corresponding respectively to the lanes, and distributing the downstream dataflow to the determined frame buffer, and the outputting of the downstream dataflow through the lanes may include outputting the downstream dataflow stored in the frame buffer through a lane corresponding to the frame buffer.

The determining of the frame buffer may include determining the frame buffer to which the downstream dataflow is to be distributed based on a transmission time of a multipoint control protocol (MPCP) frame to be output through the lane and on a delay time due to a parity addition.

The outputting of the downstream dataflow through the lanes may include outputting the downstream dataflow through the lanes using a same wavelength, and an ONU connected to each of the lanes may be registered in the OLT for each lane.

The outputting of the downstream dataflow through the lanes may include outputting the downstream dataflow to an ONU by multiplexing the downstream dataflow output through the lanes using different wavelengths, and the ONU may be registered in the OLT through a lane using a same wavelength as a wavelength used by the ONU among the lanes.

The ONU may be connected to the lanes through different wavelengths, and registered in the OLT through any one lane among the lanes to which the ONU is connected.

According to another aspect, there is provided a method to be performed by an OLT to register an ONU, the method including identifying a rate supported by the ONU using a discovery gate frame, determining a lane to be used by the ONU based on the rate supported by the ONU, transmitting, to the ONU, information on the determined lane to assign the lane to the ONU, and verifying whether the ONU is connected to the OLT through the determined lane.

The identifying of the rate may include generating the discovery gate frame including information on a rate supported by the OLT and on a discovery window to which the ONU transmits a registration request frame, transmitting the generated discovery gate frame to the ONU, and receiving the registration request frame transmitted from the ONU based on the information on the discovery window. The registration request frame may include information on the rate supported by the ONU.

The transmitting of the information on the lane may include generating a registration MPCP frame indicating the lane to be used by the ONU through a bitmapping method, and transmitting the generated registration MPCP frame to the ONU.

The verifying of whether the ONU is connected to the OLT may include generating a gate MPCP frame including grant number information indicating information on a lane of the OLT to which the ONU transmits a registration acknowledgement frame, transmitting the generated gate MPCP frame to the ONU, receiving the registration acknowledgement frame transmitted from the ONU through the lane, and verifying whether the ONU is connected to the OLT through the determined lane using information included in the registration acknowledgement frame and associated with an assignment of a lane to the ONU.

According to still another aspect, there is provided a method to be performed by an ONU to be registered in an OLT, the method including transmitting, to the OLT, information on a rate supported by the ONU using a registration request frame, receiving, from the OLT, information on a lane to be used by the ONU, and verifying whether the ONU is connected to the OLT based on the information on the lane to be used by the ONU.

The transmitting may include receiving, from the OLT, a discovery gate frame including information on a rate supported by the OLT and on a discovery window to which the ONU transmits the registration request frame, generating the registration request frame including the information on the rate supported by the ONU, and transmitting the registration request frame to the OLT based on the information on the discovery window.

The verifying of whether the ONU is connected to the OLT may include receiving, from the OLT, a gate MPCP frame including grant number information indicating information on a lane of the OLT to which the ONU transmits a registration acknowledgement frame, generating the registration acknowledgement frame based on the information on the lane to be used by the ONU, and transmitting the registration acknowledgement frame to the lane of the OLT using the grant number information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 24 is a diagram illustrating a structure of a registration multipoint control protocol (MPCP) frame according to an example embodiment;

FIG. 28 is a flowchart illustrating a method to be performed by an ONU to be registered in an OLT according to an example embodiment.

DETAILED DESCRIPTION

Figure 1:
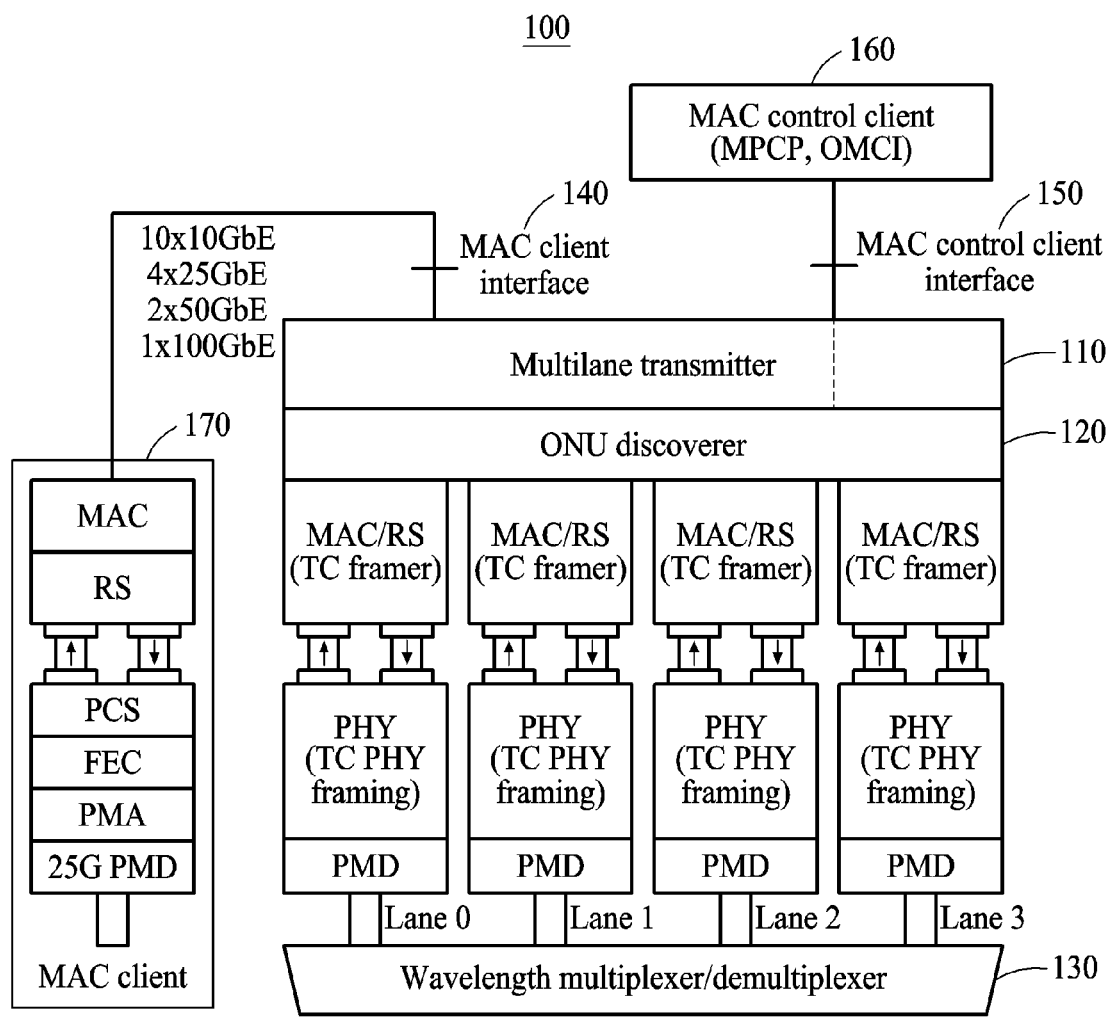
FIG. 1 is a diagram illustrating a portion of a structure of an optical line terminal (OLT) according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings. Like reference numerals in the drawings denote like elements, and a known function or configuration will be omitted herein.

FIG. 1 is a diagram illustrating a portion of a structure of an optical line terminal (OLT) 100 according to an example embodiment.

Referring to FIG. 1, the OLT 100 includes four lanes, for example, lane 0, lane 1, lane 2, and lane 3, and may support a transmission rate of 10 gigabits per second (Gb/s) or higher for each lane. Here, a lane refers to a passage through which the OLT 100 exchanges a frame with an optical network unit (ONU), and includes a media access control (MAC)/reconciliation sublayer (RS) layer (transmission convergence [TC] framer), a physical (PHY) layer (TC PHY framing layer), and a physical medium-dependent (PMD) layer. Hereinafter, a transmission rate supported by a lane is assumed to be 25 Gb/s.

In an Ethernet passive optical network (EPON), through the MAC/RS layer, the OLT 100 may check a frame check sequence (FCS), generate and cancel a preamble, and check a MAC address for a frame. Through the MAC/RS layer, the OLT 100 may match the PHY layer in accordance with a media-independent interface (MII) standard. In a gigabit-capable passive optical network (GPON), through the MAC/RS layer, the OLT 100 may process a frame using a GPON encapsulation method (GEM).

In the EPON, the PHY layer may include a physical coding sublayer (PCS), a forward error correction (FEC), and a physical medium attachment (PMA). Through the PHY layer, the OLT 100 may perform functions, for example, 64B/66B transmission encoding in accordance with an Ethernet protocol standard, and scrambling, which are performed in the PHY layer of Ethernet. In the GPON, the OLT 100 may perform TC framing based on a cycle of 125 microseconds (μs). Through the PMD layer, the OLT 100 may perform electrical-to-optical or optical-to-electrical conversion on an electrical signal. The OLT 100 may include an optical module configured to output optical signals with different wavelengths or identical wavelengths for each lane.

Referring to FIG. 1, the OLT 100 includes an ONU discoverer 120 configured to discover and manage an ONU using a multipoint control protocol (MPCP) or a physical layer operation, admission, and management (PLOAM) protocol. The ONU discoverer 120 may discover and register ONUs and allocate a band to the ONUs for each lane under the control of a MAC control client 160. The ONU discoverer 120 may be connected to the MAC control client 160 through a MAC control client interface 150. The ONU discoverer 120 may multiplex or demultiplex a MAC frame of a MAC client 170 and an MPCP frame of the MAC control client 160. The ONU discoverer 120 may determine whether each lane discovers and registers an ONU based on a parameter set by a user.

A multilane transmitter 110 may be connected to the ONU discoverer 120, and to the MAC client 170 through a MAC client interface 140. The multilane transmitter 110 may accommodate the MAC client interface 140 that supports various transmission rates. The multilane transmitter 110 may perform a conversion between a dataflow to be transferred to the MAC client interface 140 and a frame to be transferred through the multiple lanes. The dataflow may include a downstream dataflow to be transferred from the MAC client 170 to an ONU and an upstream dataflow to be transferred from the ONU to the MAC client 170.

As described above, the downstream dataflow refers to a flow of data to be transmitted to the ONU, and a MAC frame may be transferred from the MAC client 170 to the multilane transmitter 110 along the downstream dataflow. When a transmission rate of the downstream dataflow differs from a transmission rate supported by the lanes, the multilane transmitter 110 may combine or distribute the downstream dataflow with respect to the lanes based on the transmission rate supported by the lanes.

For example, the multilane transmitter 110 may combine a plurality of downstream dataflows to be transmitted through a single lane. The multilane transmitter 110 may also distribute a single downstream dataflow to be transmitted through multiple lanes. In such a case, an ONU may have an effect of, for example, receiving data through a single lane having a transmission rate corresponding to a sum of respective transmission rates of the multiple lanes. The distribution performed by the multilane transmitter 110 to distribute a single downstream dataflow to be transmitted through multiple lanes is referred to as channel bonding. In contrast, an operation other than the channel bonding performed by the multilane transmitter 110 is referred to as channel unbinding. That is, an operation performed by the multilane transmitter 110 to combine a plurality of downstream dataflows to be transmitted through a single lane is also referred to as the channel unbinding.

The upstream dataflow refers to a flow of data output through the multilane transmitter 110 of the OLT 100, and a MAC frame may be transferred from the multilane transmitter 110 to the MAC client 170 along the upstream dataflow. The multilane transmitter 110 may output, through the upstream dataflow, a MAC frame received from an ONU.

The multilane transmitter 110 may combine or distribute a MAC frame received through a lane based on a transmission rate supported by the lane and a transmission rate supported by the upstream dataflow. For example, the multilane transmitter 110 may combine MAC frames transferred through multiple lanes to be transmitted through a single dataflow. In contrast, the multilane transmitter 110 may distribute MAC frames to a plurality of dataflows so that a MAC frame transferred through a single lane is transmitted through the dataflows.

While discovering an ONU, the ONU discoverer 120 may verify whether the ONU transmits or receives data through the channel bonding. When the ONU supports the channel bonding, the OLT 100 may allocate multiple lanes to the ONU. Further, the OLT 100 may adjust the number of lanes to be allocated to each ONU by verifying whether each ONU supports the channel bonding. The multilane transmitter 110 may perform the channel bonding or the channel unbinding based on a lane allocated to each ONU. Thus, the OLT 100 may use multiple lanes more effectively.

The OLT 100 also includes a wavelength multiplexer/demultiplexer 130 configured to multiplex a signal output through the multiple lanes or demultiplex a single optical signal based on a wavelength.

Figure 2:
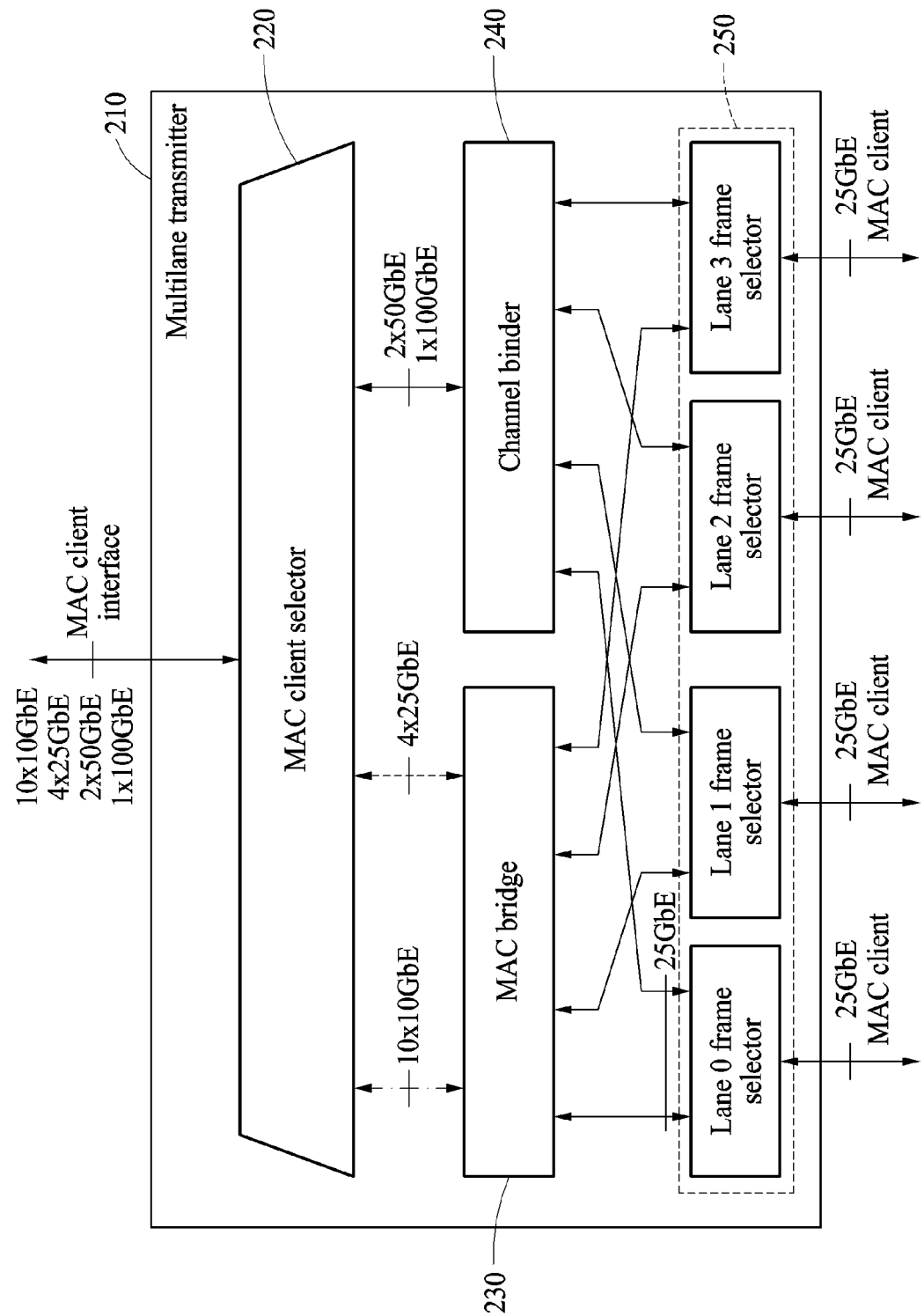
FIG. 2 is a diagram illustrating a structure of a multilane transmitter according to an example embodiment.

FIG. 2 is a diagram illustrating a structure of a multilane transmitter 210 according to an example embodiment. The multilane transmitter 210 of FIG. 2 may be provided in a structure identical to the structure of the multilane transmitter 110 illustrated in FIG. 1.

Referring to FIG. 2, in a 100 Gb/s EPON (100G-EPON), the multilane transmitter 210 may receive a dataflow through a 10×10 gigabit Ethernet (GbE) MAC client interface, a 4×25 GbE MAC client interface, a 2×50 GbE MAC client interface, and a 1×100 GbE MAC client interface. The multilane transmitter 210 may receive ten dataflows having a transmission rate of 10 Gb/s through the 10×10 GbE MAC client interface. The multilane transmitter 210 may receive four dataflows having a transmission rate of 25 Gb/s through the 4×25 GbE MAC client interface. The multilane transmitter 210 may receive two dataflows having a transmission rate of 50 Gb/s through the 2×50 GbE MAC client interface. The multilane transmitter 210 may receive one dataflow having a transmission rate of 100 Gb/s through the 1×100 GbE MAC client interface.

The multilane transmitter 210 includes a MAC client selector 220 configured to compare a transmission rate of a dataflow supported by a MAC client interface to a transmission rate of a lane. The MAC client selector 220 may transfer, to a MAC bridge 230 or a channel binder 240, at least one downstream dataflow transferred through the MAC client interface based on a result of the comparison of the transmission rates. That is, the MAC client selector 220 may determine a path of the downstream dataflow transferred through the MAC client interface based on a rate supported by the MAC client interface.

Referring to FIG. 2, when a transmission rate of a dataflow is 10 Gb/s, the MAC client selector 220 may transfer, to the MAC bridge 230, ten downstream dataflows transferred through the MAC client interface. When a transmission rate of a dataflow is 25 Gb/s, the MAC client selector 220 may transfer, to the MAC bridge 230, four downstream dataflows transferred through the MAC client interface. The MAC bridge 230 may process a downstream dataflow by performing channel unbinding.

When a transmission rate of a dataflow is 50 Gb/s, the MAC client selector 220 may transfer, to the channel binder 240, two downstream dataflows transferred through the MAC client interface. When a transmission rate of a dataflow is 100 Gb/s, the MAC client selector 220 may transfer, to the channel binder 240, one downstream dataflow transferred through the MAC client interface. The channel binder 240 may process a downstream dataflow by performing channel bonding.

The multilane transmitter 210 includes the MAC bridge 230 configured to process a downstream dataflow by performing the channel unbinding. When a transmission rate of a downstream dataflow is equal to a transmission rate of a lane, the MAC bridge 230 may be bypassed so that the downstream dataflow is transmitted to multiple lanes. When a transmission rate of a downstream dataflow is 25 Gb/s, the MAC bridge 230 may be bypassed so that the downstream dataflow is transmitted to multiple lanes having a transmission rate of 25 Gb/s. That is, the four downstream dataflows may be distributed to the four lanes, respectively.

When a transmission rate of a downstream dataflow is less than a transmission rate of a lane, the MAC bridge 230 may combine a plurality of downstream dataflows based on the transmission rate of a lane. The MAC bridge 230 may combine the downstream dataflows in order not to exceed the transmission rate of a lane. When a transmission rate of a downstream dataflow is 10 Gb/s, the MAC bridge 230 may combine transferred ten downstream dataflows to be transmitted through the four lanes.

The multilane transmitter 210 includes the channel binder 240 configured to perform the channel bonding to process a downstream dataflow. The channel binder 240 may divide a downstream dataflow having a transmission rate that exceeds the transmission rate of a lane. When a transmission rate of a dataflow is 50 Gb/s, the channel binder 240 may divide two downstream dataflows to be transmitted through the four lanes having a transmission rate of 25 Gb/s. When a transmission rate of a dataflow is 100 Gb/s, the channel binder 240 may divide one downstream dataflow to be transmitted through the four lanes having a transmission rate of 25 Gb/s.

Through the MAC bridge 230 or the channel binder 240, a downstream dataflow may be converted to a signal having a rate of 25 Gb/s, which is the transmission rate of a lane. The multilane transmitter 210 may perform the channel bonding or the channel unbinding based on a transmission rate supported by the MAC client interface to transmit a signal of 25 Gb/s through each lane.

The multilane transmitter 210 includes a lane frame selector 250 corresponding to each of the multiple lanes. For a downstream dataflow, the lane frame selector 250 may select one of the MAC bridge 230 and the channel binder 240 to transmit the signal of 25 Gb/s to a lane. For an upstream dataflow, the lane frame selector 250 may transfer the signal of 25 Gb/s input through a lane to one of the MAC bridge 230 and the channel binder 240.

Figure 3:
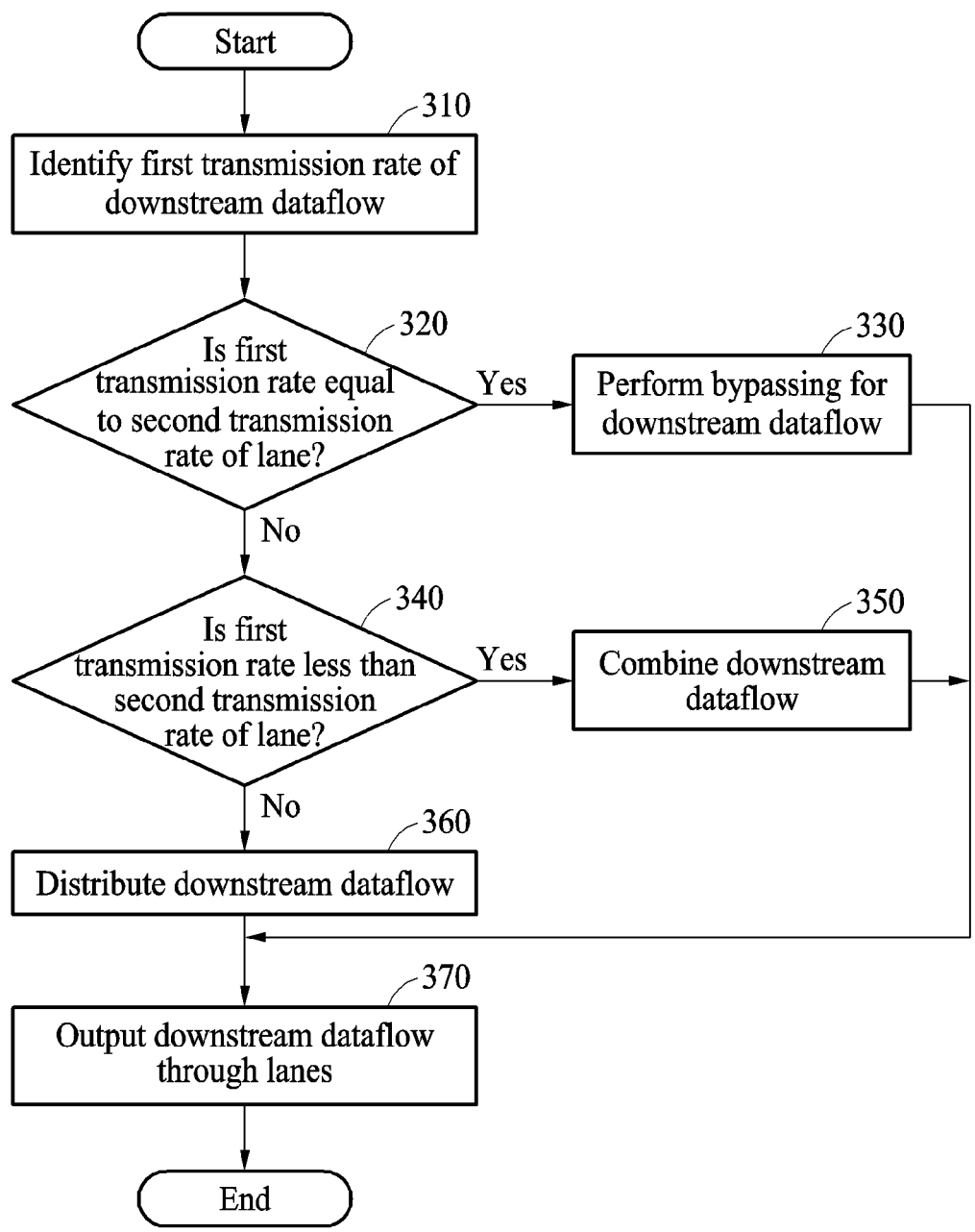
FIG. 3 is a flowchart illustrating a process of performing, by an OLT, channel bonding or channel unbinding on a downstream dataflow according to an example embodiment.

FIG. 3 is a flowchart illustrating a process of performing, by an OLT, channel bonding or channel unbinding on a downstream dataflow according to an example embodiment. According to an example embodiment, the OLT may perform operations described with reference to FIG. 3 through a multilane transmitter. Based on the operations, a non-transitory computer-readable recording medium may be provided in a computer in which a program to perform a method of processing, by an OLT, a downstream dataflow, is recorded. The program may include at least one of an application program, a device driver, a firmware, a middleware, a dynamic link library (DLL), and an applet, which store therein the method. According to an example embodiment, the OLT may include a processor, and the processor may perform the method of processing the downstream dataflow by reading the recording medium in which the method is recorded.

Referring to FIG. 3, in operation 310, the OLT identifies a first transmission rate of at least one downstream dataflow transferred through a MAC client interface. The OLT may identify the first transmission rate by communicating with a MAC client or detecting the number of downstream dataflows. The OLT may compare the first transmission rate to a second transmission rate of a lane of the OLT.

When the first transmission rate is equal to the second transmission rate in operation 320, the OLT bypasses a MAC bridge for the downstream dataflow in operation 330. As described with reference to FIG. 2, when the first transmission rate is equal to the second transmission rate, the OLT may transfer the downstream dataflow to the MAC bridge through a MAC client selector.

Figure 4:
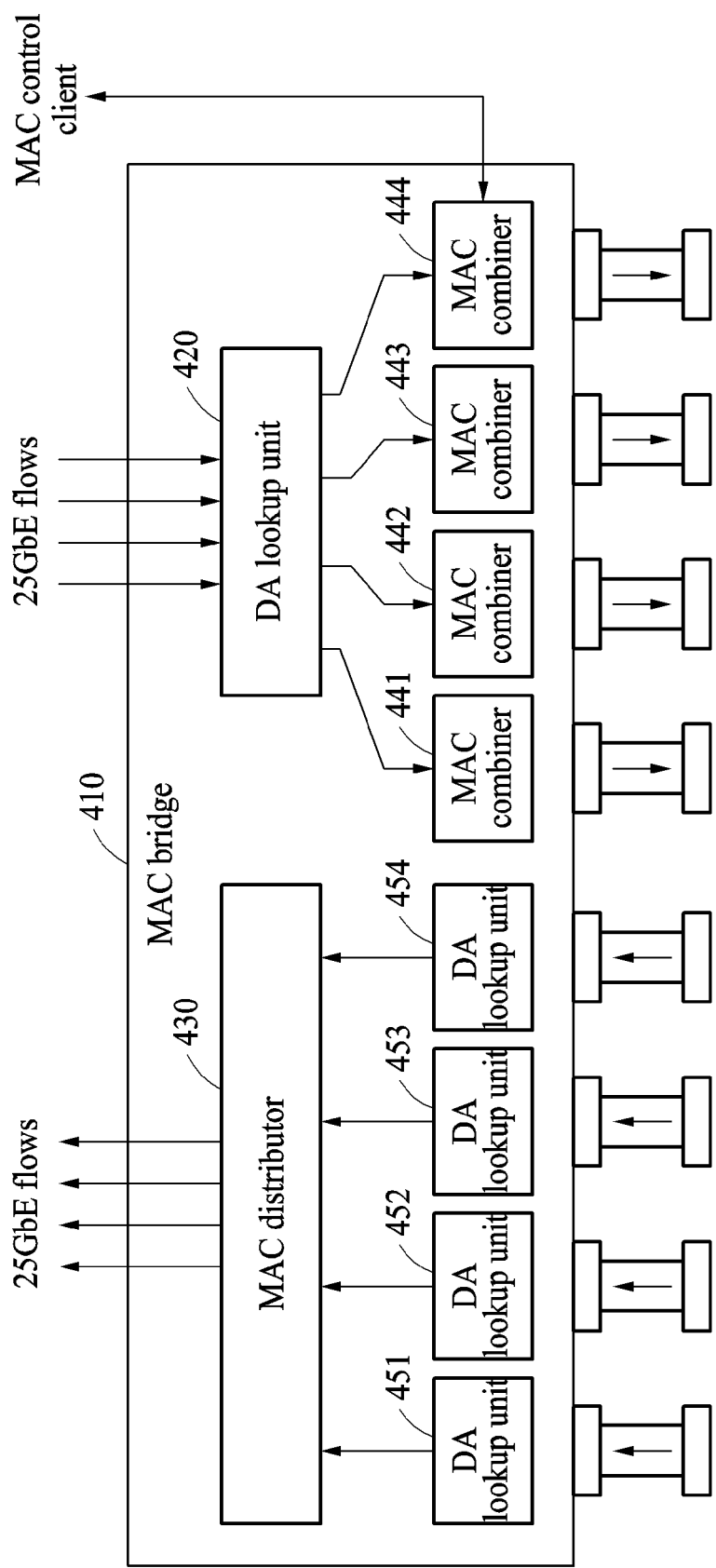
FIG. 4 is a diagram illustrating an operation to be performed by a media access control (MAC) bridge when a first transmission rate of a downstream dataflow is equal to a second transmission rate of a land of an OLT according to an example embodiment.

FIG. 4 is a diagram illustrating an operation to be performed by a MAC bridge 410 when a first transmission rate of a downstream dataflow is equal to a second transmission rate of a lane of an OLT according to an example embodiment. Referring to FIG. 4, the MAC bridge 410 includes a destination address (DA) lookup unit 420 configured to process a downstream dataflow, and a MAC combiner 441, a MAC combiner 442, a MAC combiner 443, and a MAC combiner 444 that are independent from one another corresponding to each of multiple lanes. The MAC combiners 441, 442, 443, and 444 may multiplex a dataflow in a grant/ready method. The DA lookup unit 420 may transmit a downstream dataflow to any one of the MAC combiners 441, 442, 443, and 444 using a DA lookup.

Referring to FIG. 4, when a first transmission rate of a downstream dataflow is equal to a second transmission rate of a lane of an OLT, four downstream dataflows included in a MAC client interface may be transmitted to the DA lookup unit 420. To transmit the four downstream dataflows through four lanes, the DA lookup unit 420 may transfer the downstream dataflows to the MAC combiners 441, 442, 443, and 444. When the first transmission rate is equal to the second transmission rate, multiplexing the downstream dataflows transferred to the MAC combiners 441, 442, 443, and 444 may not be performed. That is, a function of the MAC combiners 441, 442, 443, and 444 may not be performed on the downstream dataflows. Thus, the downstream dataflows may bypass the MAC combiners 441, 442, 443, and 444 to be transmitted to the lanes.

Referring back to FIG. 3, when the first transmission rate is less than the second transmission rate in operation 340, the OLT combines the downstream dataflow through the MAC bridge based on the second transmission rate in operation 350.

Figure 5:
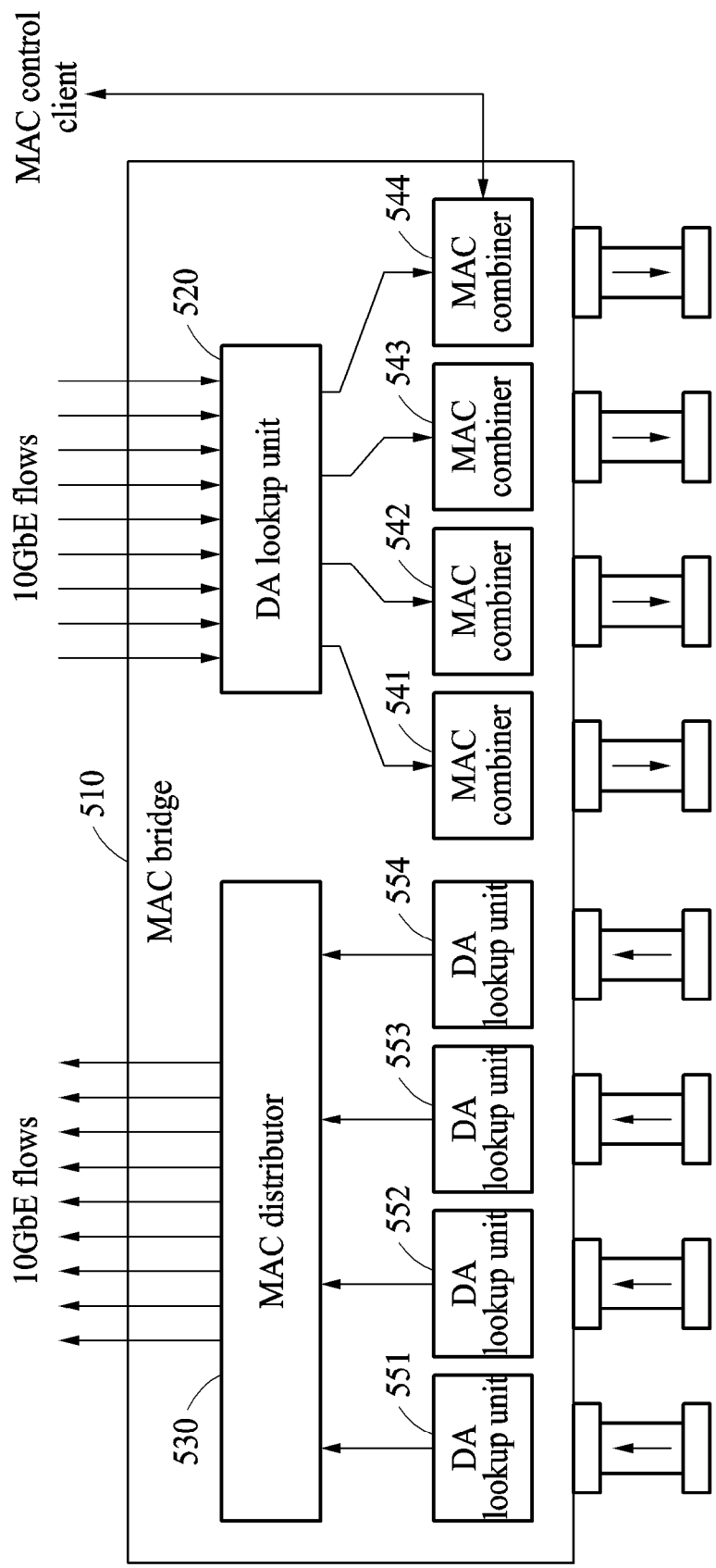
FIG. 5 is a diagram illustrating an operation to be performed by a MAC bridge when a first transmission rate of a downstream dataflow is less than a second transmission rate of a lane of an OLT according to an example embodiment.

FIG. 5 is a diagram illustrating an operation to be performed by a MAC bridge 510 when a first transmission rate of a downstream dataflow is less than a second transmission rate of a lane of an OLT according to an example embodiment. The MAC bridge 510 may combine ten 10 Gb/s downstream dataflows transferred through an address layer 2 (L2) lookup method. The MAC bridge 510 may combine the downstream dataflows based on a transmission rate of 25 Gb/s, which is a transmission rate of a lane of an OLT.

In detail, referring to FIG. 5, a DA lookup unit 520 may transmit a downstream dataflow to any one of MAC combiners 541, 542, 543, and 544 using a DA lookup. To perform the DA lookup on the downstream dataflow, the DA lookup unit 520 may store a source address (SA) of a MAC frame to be transferred upstream and a lane number. Referring to FIG. 5, ten downstream dataflows having a first transmission rate less than the second transmission rate may be transferred to the DA lookup unit 520. Through the DA lookup, the DA lookup unit 520 may determine a lane to which a MAC frame transferred through the downstream dataflow is to be transmitted based on a lane of a MAC frame to be transferred upstream. The MAC frames may be transmitted to a MAC combiner corresponding to the determined lane. That is, the ten downstream dataflows may be transmitted to any one of the MAC combiners 541, 542, 543, and 544 based on the DA lookup.

The MAC combiners 541, 542, 543, and 544 may multiplex or combine the input 10 Gb/s downstream dataflows in order not to exceed a maximum transmission rate of each lane. The MAC combiners 541, 542, 543, and 544 may multiplex or combine the MAC frame transferred through the downstream dataflow by a grant/ready method.

For example, when a MAC frame needs to be transferred to the MAC combiner 543 through a downstream dataflow, the MAC bridge 510 may transfer, to the MAC combiner 543, a ready signal transferred from a MAC client interface. When the ready signal is received, a scheduler of the MAC combiner 543 may receive the MAC frame from the MAC combiner 543 by assigning a grant using a round-robin type scheduler. When the grant is assigned, the DA lookup unit 520 may transmit the MAC frame to the MAC combiner 543.

The MAC combiners 541, 542, 543, and 544 may combine MAC frames included in the downstream dataflow transferred by the grant/ready method in order not to exceed a transmission rate of 25 Gb/s, which is the transmission rate of a lane. When the MAC frames included in the downstream dataflow is input while exceeding a maximum transmission rate of a lane, the MAC combiners 541, 542, 543, and 544 may discard MAC frames corresponding to a portion that exceeds the maximum transmission rate.

Referring back to FIG. 3, when the first transmission rate is greater than the second transmission rate, the OLT distributes the downstream dataflow through a channel binder based on the second transmission rate in operation 360.

Figure 6:
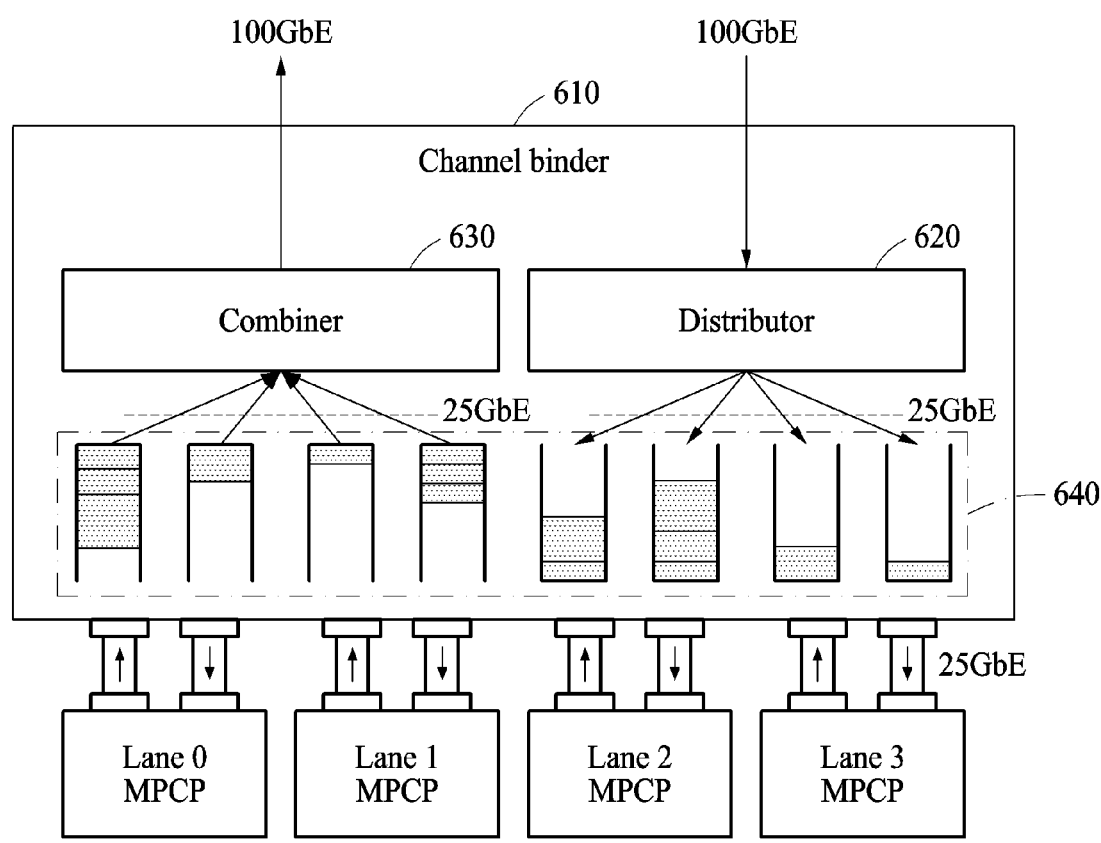
FIG. 6 is a diagram illustrating an operation to be performed by a channel binder when a first transmission rate of a downstream dataflow is greater than a second transmission rate of a lane of an OLT according to an example embodiment.

FIG. 6 is a diagram illustrating an operation to be performed by a channel binder 610 when a first transmission rate of a downstream dataflow is greater than a second transmission rate of a lane of an OLT according to an example embodiment. Although FIG. 6 illustrates a case that a single downstream dataflow having a transmission rate of 100 Gb/s is transferred to the channel binder 610 through a MAC client interface, the operation to be described hereinafter with reference to FIG. 6 may also be performed in a case that two downstream dataflows having a transmission rate of 50 Gb/s are transferred.

Referring to FIG. 6, the channel binder 610 includes a plurality of frame buffers 640 that independently store MAC frames to be transmitted through each lane with respect to a downstream dataflow, and a distributor 620 configured to transfer the MAC frames to any one of the frame buffers 640 based on respective capacities of the frame buffers 640 for each lane.

Each of the frame buffers 640 may store a MAC frame at a rate of 100 Gb/s, and output the MAC frame at a rate of 25 Gb/s. The channel binder 610 may transmit the MAC frame transmitted at the rate of 100 Gb/s through the downstream dataflow to a frame buffer in which a least number of MAC frames on standby is present among the frame buffers 640. That is, the MAC frame may be transmitted to a frame buffer having a greatest remaining capacity among the frame buffers 640, and the channel binder 610 may output the MAC frames in order starting with a MAC frame that is transmitted first to the frame buffers 640.

The channel binder 610 may output the MAC frame that is transmitted first to the frame buffers 640 based on a transmission time of an MPCP frame and a time delay due to an FEC buffer in a PHY layer. In detail, the channel binder 610 may output the MAC frame based on Equation 1 below.

$$T_{avail}'(N) = T_{avail}(N) + MPCP_{tx\_duration} + tx\_duration(F) + FEC\_delay(F) \quad \text{[Equation 1]}$$

Referring to Equation 1, when comparing frame buffer occupancies, the channel binder 610 may consider a minimum MPCP frame transmission time ($MPCP_{tx\_duration}$) in addition to an occupancy ($T_{avail}(N)$) of each of the frame buffers 640. Further, the channel binder 610 may also consider a processing time delay (FEC_delay(F)) that may be caused by buffering in FEC processing. A maximum deviation of the processing time delay due to the buffering may be 32 nanoseconds (ns), and the minimum MPCP frame transmission time may be a length of 64 bytes.

Referring back to FIG. 3, in operation 370, the OLT outputs the downstream dataflow transferred from the MAC bridge or the channel binder through multiple lanes. According to an example embodiment, the OLT may support a channel bonding protocol in an upper layer than an ONU discovery protocol. In such a case, the OLT may transmit the downstream dataflow transferred from the MAC bridge or the channel binder to an ONU discoverer through a lane frame selector.

Figure 7:
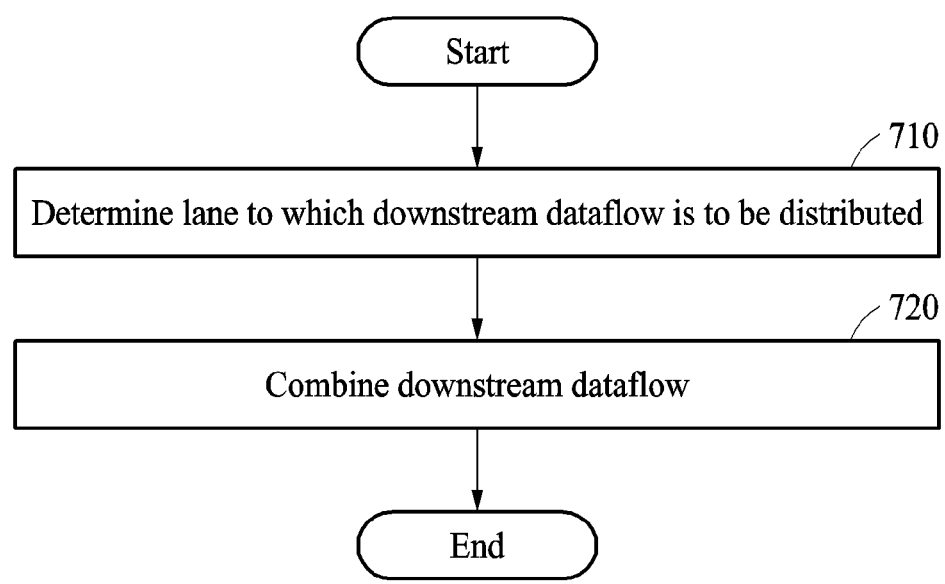
FIG. 7 is a flowchart illustrating a process of combining, by an OLT, a downstream dataflow based on a second transmission rate of a lane of the OLT when a first transmission rate of the downstream dataflow is less than the second transmission rate according to an example embodiment.

FIG. 7 is a flowchart illustrating a process of combining, by an OLT, a downstream dataflow based on a second transmission rate of a lane of the OLT when a first transmission rate of the downstream dataflow is less than the second transmission rate according to an example embodiment. The operations to be described hereinafter with reference to FIG. 7 may be performed through a MAC bridge of a multilane transmitter of the OLT.

Referring to FIG. 7, in operation 710, the OLT determines, among multiple lanes, a lane to which the downstream dataflow is to be distributed based on a destination address (DA). The OLT may determine the lane to which the downstream dataflow is to be distributed using a DA included in a MAC frame transferred through the downstream dataflow. That is, the lane to which the downstream dataflow is to be distributed may be determined based on which lane among the multiple lanes is connected to an ONU to which the MAC frame is to be transmitted.

In operation 720, the OLT combines the downstream dataflow based on the determined lane in order not to exceed the second transmission rate of the lanes of the OLT. The OLT may multiplex or combine MAC frames transferred through the downstream dataflow in order not to exceed the second transmission rate.

Figure 8:
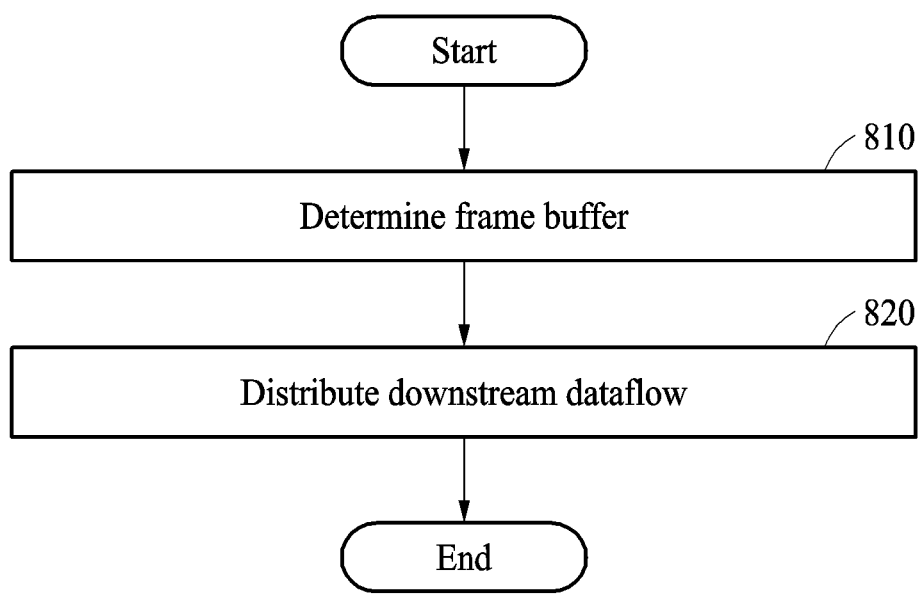
FIG. 8 is a flowchart illustrating a process of distributing, by an OLT, a downstream dataflow based on a second transmission rate of a lane of the OLT when a first transmission rate of the downstream dataflow is greater than the second transmission rate according to an example embodiment.

FIG. 8 is a flowchart illustrating a process of distributing, by an OLT, a downstream dataflow based on a second transmission rate of a lane of the OLT when a first transmission rate of the downstream dataflow is greater than the second transmission rate according to an example embodiment. The operations to be described hereinafter with reference to FIG. 8 may be performed through a channel binder of a multilane transmitter of the OLT.

Referring to FIG. 8, in operation 810, the OLT determines a frame buffer to which the downstream dataflow is to be distributed based on respective capacities of frame buffers corresponding respectively to multiple lanes. The OLT may include a plurality of frame buffers storing a MAC frame for each lane. The OLT may determine, among the frame buffers, a frame buffer having a greatest remaining capacity to be a frame buffer to store a MAC frame. The OLT may determine the frame buffer to which the downstream dataflow is to be distributed to minimize a difference between remaining capacities of the frame buffers. The OLT may determine the frame buffer to which the downstream dataflow is to be distributed based on a transmission time of an MPCP frame to be output through a lane and on a delay time due to a parity addition.

A writing rate of a frame buffer may be equal to a maximum transmission rate supported by a MAC client interface, and a reading rate of a frame buffer may be equal to a maximum transmission rate supported by a lane.

In operation 820, the OLT distributes the downstream dataflow to the determined frame buffer. The OLT may store, in the determined frame buffer, the MAC frame transferred through the downstream dataflow. The OLT may output the MAC frame stored in the frame buffer through a lane corresponding to the frame buffer. The OLT may output MAC frames in order starting with a MAC frame stored first in the frame buffer.

Figure 9:
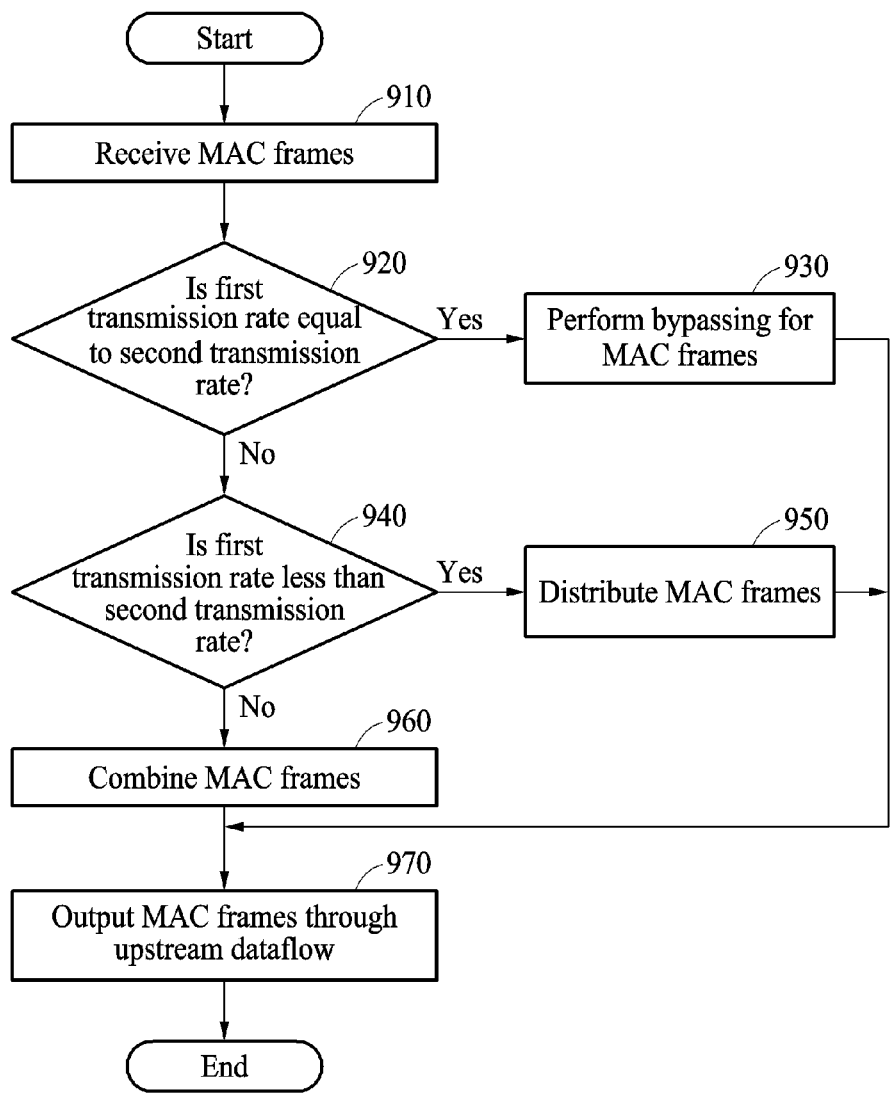
FIG. 9 is a flowchart illustrating a process of transmitting, by an OLT, a MAC frame received from an optical network unit (ONU) to a MAC client through an upstream dataflow according to an example embodiment.

FIG. 9 is a flowchart illustrating a process of transmitting, by an OLT, a MAC frame received from an ONU to a MAC client through an upstream dataflow according to an example embodiment. Corresponding to channel bonding or channel unbinding performed on a downstream dataflow, the OLT may combine or distribute the MAC frame received from the ONU with respect to the upstream dataflow.

Referring to FIG. 9, in operation 910, the OLT receives MAC frames output by the ONU through multiple lanes. The ONU may transfer a MAC frame through at least one of the lanes. The OLT may detect an upstream dataflow for the ONU or a transmission rate of a downstream dataflow, using information on a lane assigned to the ONU. The OLT may compare a first transmission rate of the downstream dataflow corresponding to the MAC frame to a second transmission rate of the lanes.

When the first transmission rate of the downstream dataflow corresponding to MAC frames is equal to the second transmission rate in operation 920, the OLT bypasses a MAC bridge for the MAC frames in operation 930. That is, when the transmission rate of the downstream dataflow is 25 Gb/s, the OLT may bypass the MAC bridge for MAC frames transmitted through four lanes. Referring back to FIG. 4, the MAC bridge 410 of the OLT includes a MAC distributor 430 configured to distribute MAC frames to an upstream dataflow. The OLT may bypass the MAC distributor 430 to transmit 25 Gb/s MAC frames transferred through DA lookup units 451, 452, 453, and 454. Thus, the MAC frames that are transmitted at 25 Gb/s through four lanes may not be combined or distributed, but may be output to a MAC client through four upstream dataflows.

Referring back to FIG. 9, when the first transmission rate of the downstream dataflow corresponding to the MAC frames is less than the second transmission rate in operation 940, the OLT distributes the MAC frames through the MAC bridge in operation 950. Referring back to FIG. 5, the OLT may receive the MAC frames at a transmission rate of 25 Gb/s through the four lanes. The OLT may identify a transmission rate of an upstream dataflow or a downstream dataflow corresponding to the MAC frames through DA lookup units 551, 552, 553, and 554. The MAC frames may be transferred to a MAC distributor 530 from the DA lookup units 551, 552, 553, and 554.

To perform DA lookup on the upstream dataflow, the DA lookup units 551, 552, 553, and 554 may store a source address (SA) and a flow number of the MAC frames to be transmitted downstream. Through the DA lookup, the DA lookup units 551, 552, 553, and 554 may determine, among a plurality of upstream dataflows, an upstream dataflow through which a MAC frame transmitted through an upstream dataflow is to be transferred to a MAC client. The MAC distributor 530 may distribute the MAC frames in order not to exceed a transmission rate of the upstream dataflow. Using the MAC distributor 530, the OLT may distribute the MAC frames to the plurality of upstream dataflows. Thus, through the DA lookup, the MAC frames may be distributed and transmitted to any one of the upstream dataflows.

Figure 10:
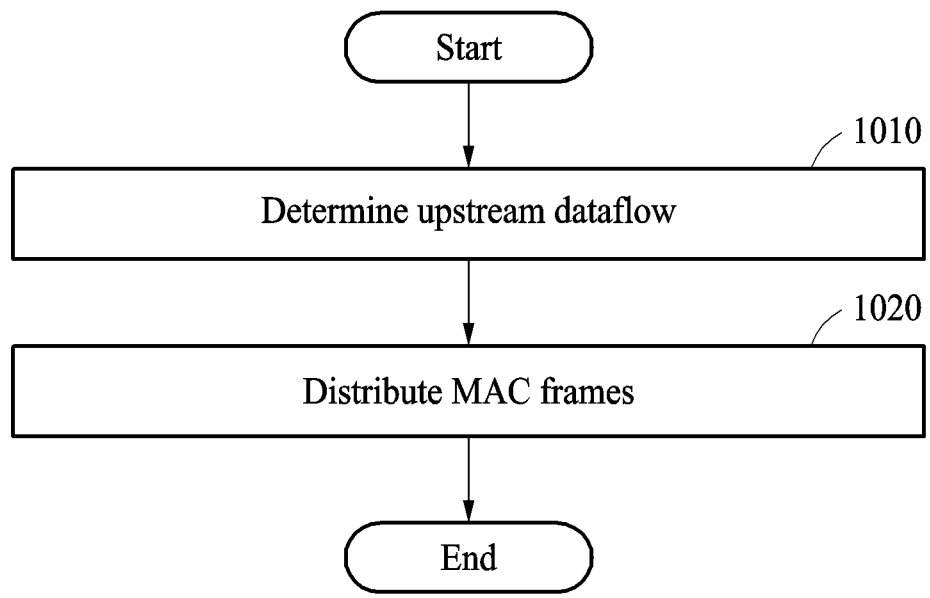
FIG. 10 is a flowchart illustrating a process of distributing, by an OLT, MAC frames through a MAC bridge according to an example embodiment.

FIG. 10 is a flowchart illustrating a process of distributing, by an OLT, MAC frames through a MAC bridge according to an example embodiment. Referring to FIG. 10, in operation 1010, the OLT determines an upstream dataflow to which each of MAC frames is to be distributed in order not to exceed a transmission rate of an upstream dataflow having the same transmission rate as a first transmission rate of a downstream dataflow of the OLT. Through L2 lookup, the OLT may determine, among ten 10 Gb/s upstream dataflows, an upstream dataflow to which a MAC frame is to be distributed.

In operation 1020, the OLT distributes the MAC frames based on the determined upstream dataflow. Thus, the MAC frames transmitted at a rate of 25 Gb/s through four lanes may be transmitted to a MAC client at a rate of 10 Gb/n through the ten upstream dataflows.

Referring back to FIG. 9, when the first transmission rate of the downstream dataflow corresponding to the MAC frames is greater than the second transmission rate, the OLT combines the MAC frames through a channel binder in operation 960. Referring back to FIG. 6, the MAC frames may be stored in a frame buffer corresponding to a lane to which the MAC frames are transmitted among the frame buffers 640. The channel binder 610 of the OLT includes a combiner 630 configured to combine the MAC frames stored in the frame buffers 640 based on a transmission rate of an upstream dataflow The combiner 630 may select a MAC frame of four frame buffers corresponding respectively to four lanes based on an allocated time slot sequence. The combiner 630 may combine the MAC frames in order of being selected. The combined MAC frames may be transferred to a MAC client through the upstream dataflow.

Figure 11:
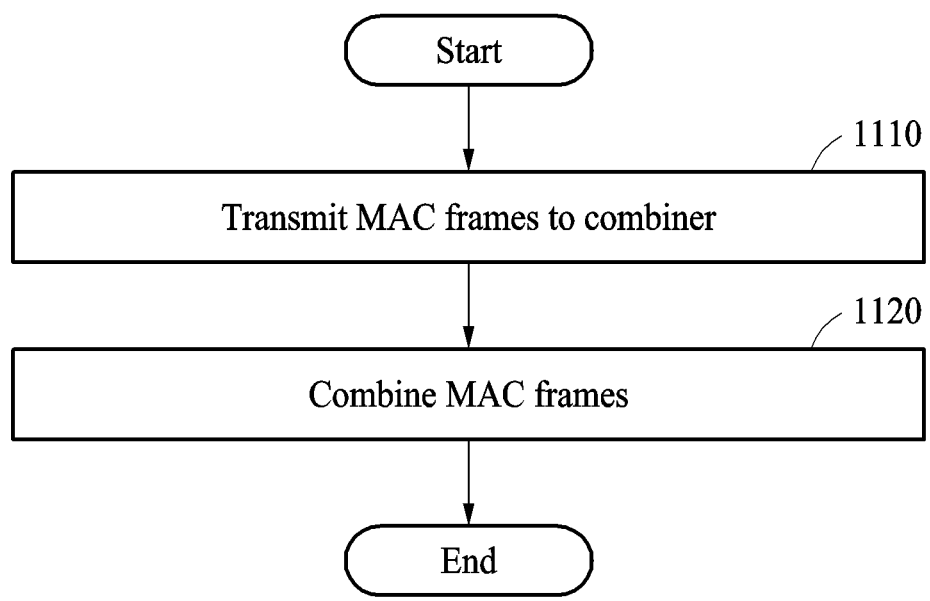
FIG. 11 is a flowchart illustrating a process of combining, by an OLT, MAC frames through a channel binder according to an example embodiment.

FIG. 11 is a flowchart illustrating a process of combining, by an OLT, MAC frames through a channel binder according to an example embodiment. Referring to FIG. 11, in operation 1110, the OLT transmits MAC frames to a combiner of the channel binder of the OLT based on a time slot sequence of the MAC frames stored in frame buffers corresponding respectively to multiple lanes. In operation 1120, the OLT combines the MAC frames through the combiner of the channel binder. The combined MAC frames may be output through at least one upstream dataflow.

Referring back to FIG. 9, in operation 970, the OLT outputs, through the upstream dataflow, the MAC frames transferred from the MAC bridge or the channel binder. Thus, the MAC frames may be distributed to the upstream dataflow or combined based on a rate supported by a MAC client interface. When a transmission rate of a lane to which a MAC frame is transmitted is greater than a transmission rate of an upstream dataflow, the MAC frame may be distributed to a plurality of upstream dataflows so that the MAC frame is transmitted at a transmission rate less than or equal to the transmission rate of the upstream dataflow. Conversely, when the transmission rate of each lane to which the MAC frame is transmitted is less than the transmission rate of the upstream dataflow, MAC frames transmitted through the multiple lanes may be combined to the upstream dataflow so that the MAC frames are transferred based on the transmission rate of the upstream dataflow.

Figure 12:
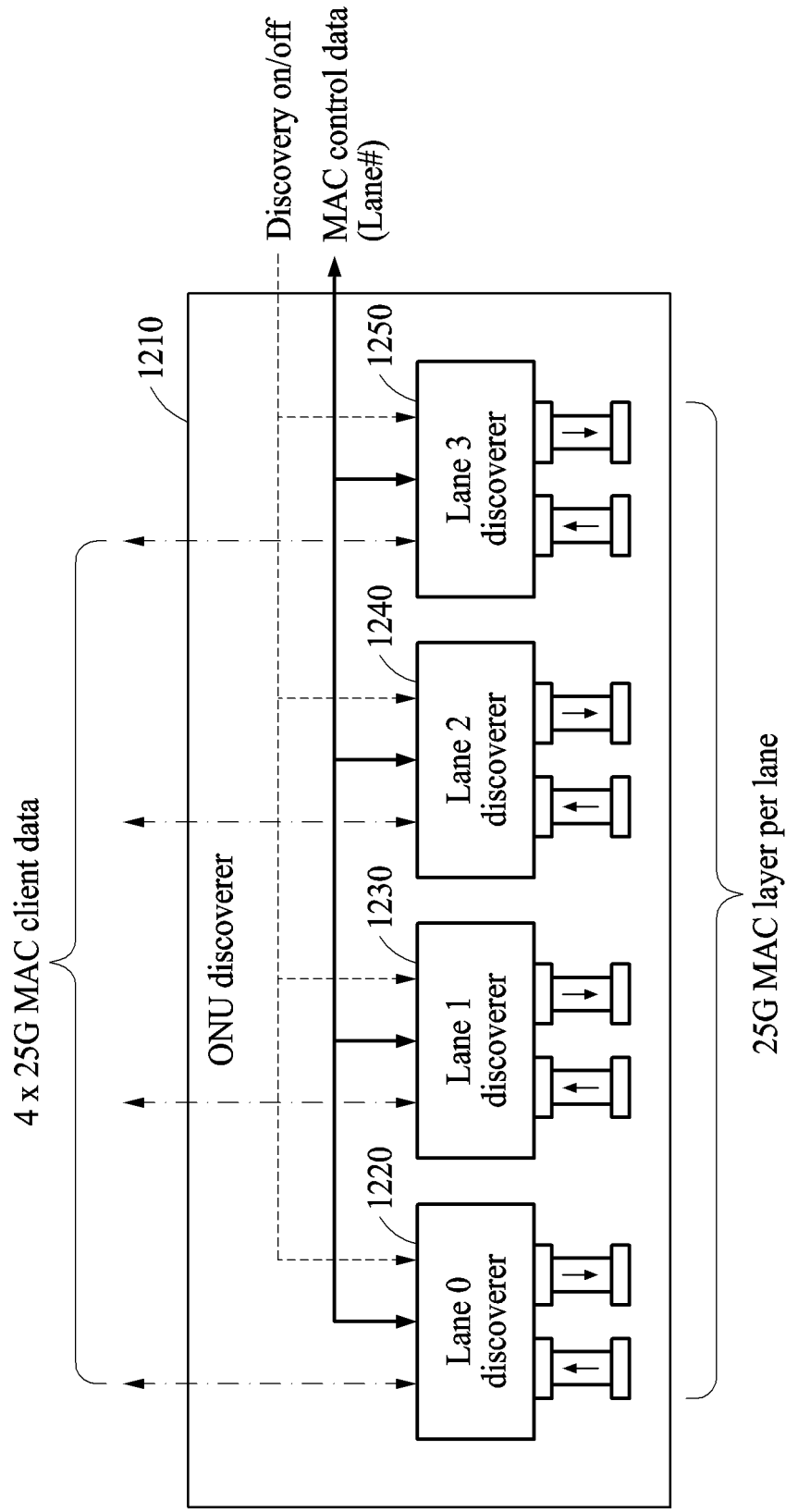
FIG. 12 is a diagram illustrating a structure of an ONU discoverer according to an example embodiment.

FIG. 12 is a diagram illustrating a structure of an ONU discoverer 1210 according to an example embodiment. The ONU discoverer 1210 may have the same configuration as the ONU discoverer 120 illustrated in FIG. 1.

Referring to FIG. 12, the ONU discoverer 1210 may independently perform an ONU discovery protocol, for example, an MPCP and a PLOAM protocol, for each lane. The ONU discoverer 1210 includes a lane 0 discoverer 1220, a lane 1 discoverer 1230, a lane 2 discoverer 1240, and a lane 3 discoverer 1250 for four lanes, lane 0, lane 1, lane 2, and lane 3, respectively. Whether to perform the ONU discovery protocol by each of the lane 0 discoverer 1220, the lane 1 discoverer 1230, the lane 2 discoverer 1240, and the lane 3 discoverer 1250 may be controlled by a user. Further, the user may transmit an MPCP frame or a PLOAM message for each lane.

Referring to FIG. 12, each of the lane 0 discoverer 1220, the lane 1 discoverer 1230, the lane 2 discoverer 1240, and the lane 3 discoverer 1250 may mange an ONU registered for each lane. For example, the lane 0 discoverer 1220 may mange only a 25G ONU, and the lane 1 discoverer 1230 may mange only a 50G ONU. The lane 2 discoverer 1240 may mange only a 100G ONU. Thus, by controlling each of the lane 0 discoverer 1220, the lane 1 discoverer 1230, the lane 2 discoverer 1240, and the lane 3 discoverer 1250, the OLT may register and mange ONUs supporting various transmission rates for each lane. A method of discovering and registering an ONU by each of the lane 0 discoverer 1220, the lane 1 discoverer 1230, the lane 2 discoverer 1240, and the lane 3 discoverer 1250 will be described in detail hereinafter.

FIGS. 13 through 20 are diagrams illustrating service scenarios based on a rate supported by an OLT and an ONU. Hereinafter, how the OLT is connected to a plurality of ONUs supporting different transmission rates will be described with reference to FIGS. 13 through 20.

Figure 13:
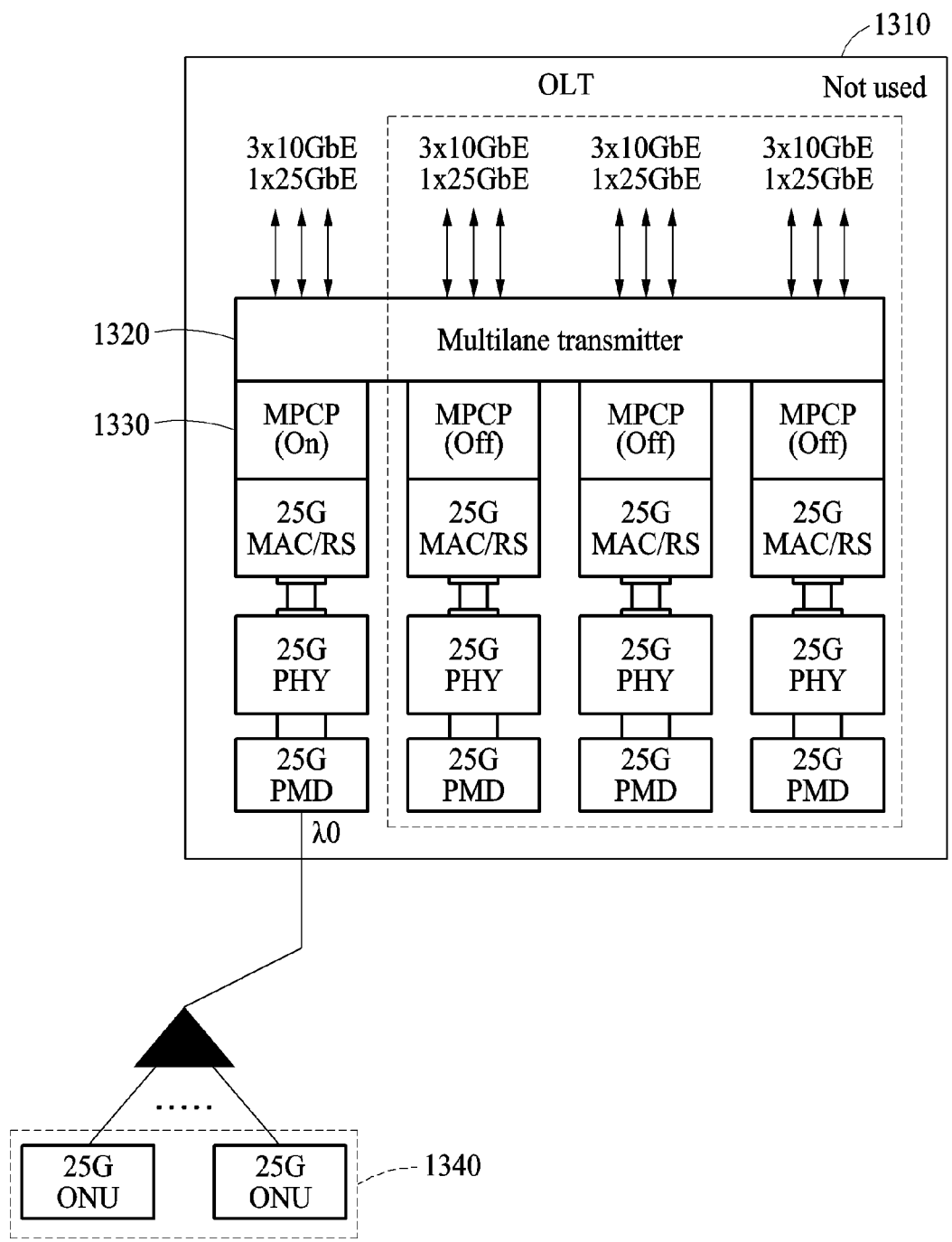
FIG. 13 is a diagram illustrating an example of a connection between an OLT and an ONU supporting a transmission rate of 25 gigabits per second (Gb/s) through one lane according to an example embodiment.

FIG. 13 is a diagram illustrating an example of a connection between an OLT 1310 and an ONU 1340 supporting a transmission rate of 25 Gb/s through one lane according to an example embodiment. Referring to FIG. 13, when a less number of ONUs supporting 25 Gb/s is used, the OLT 1310 may provide a service to the ONUs supporting 25 Gb/s through a single lane. As illustrated in FIG. 13, lane 1, lane 2, and lane 3, excluding lane 0, are not used. Thus, a lane 1 discoverer, a lane 2 discoverer, and a lane 3 discoverer included in an ONU discoverer may be inactivated. Only a lane 0 discoverer 1330 included in the ONU discoverer may be activated, and may register the ONU 1340. Although FIG. 13 illustrates an example of lane 0 being used, any one of other lanes may be set to be used. In FIGS. 13 through 20, among a lane 0 discoverer, a lane 1 discoverer, a lane 2 discoverer, and a lane 3 discoverer allocated to each lane and included in the ONU discoverer, a lane discoverer that performs an ONU discovery protocol using an MPCP frame is illustrated as "MPCP(ON)" and a lane discoverer that does not perform the ONU discovery protocol is illustrated as "MPCP(OFF)."

Since the ONU 1340 is connected to the OLT 1310 through a single lane, the OLT 1310 may verify that a transmission rate of the ONU 1340 is 25 Gb/s. Since the ONU 1340 does not support a dataflow having a transmission rate exceeding 25 Gb/s, the OLT 1310 may perform channel unbinding through a MAC bridge of a multilane transmitter 1320. Referring to FIG. 13, the multilane transmitter 1320 may accommodate a MAC client interface supporting a transmission rate of 10 Gb/s or 25 Gb/s. In such a case, the OLT 1310 may accommodate a plurality of 10 Gb/s ports or a single 25 Gb/s port.

According to an example embodiment, when the number of ONUs connected to an OLT exceeds the number of ONUs that may be connected to a single lane, the OLT may be connected to a greater number of ONUs using lane 1, lane 2, and lane 3 that are not used.

Figure 14:
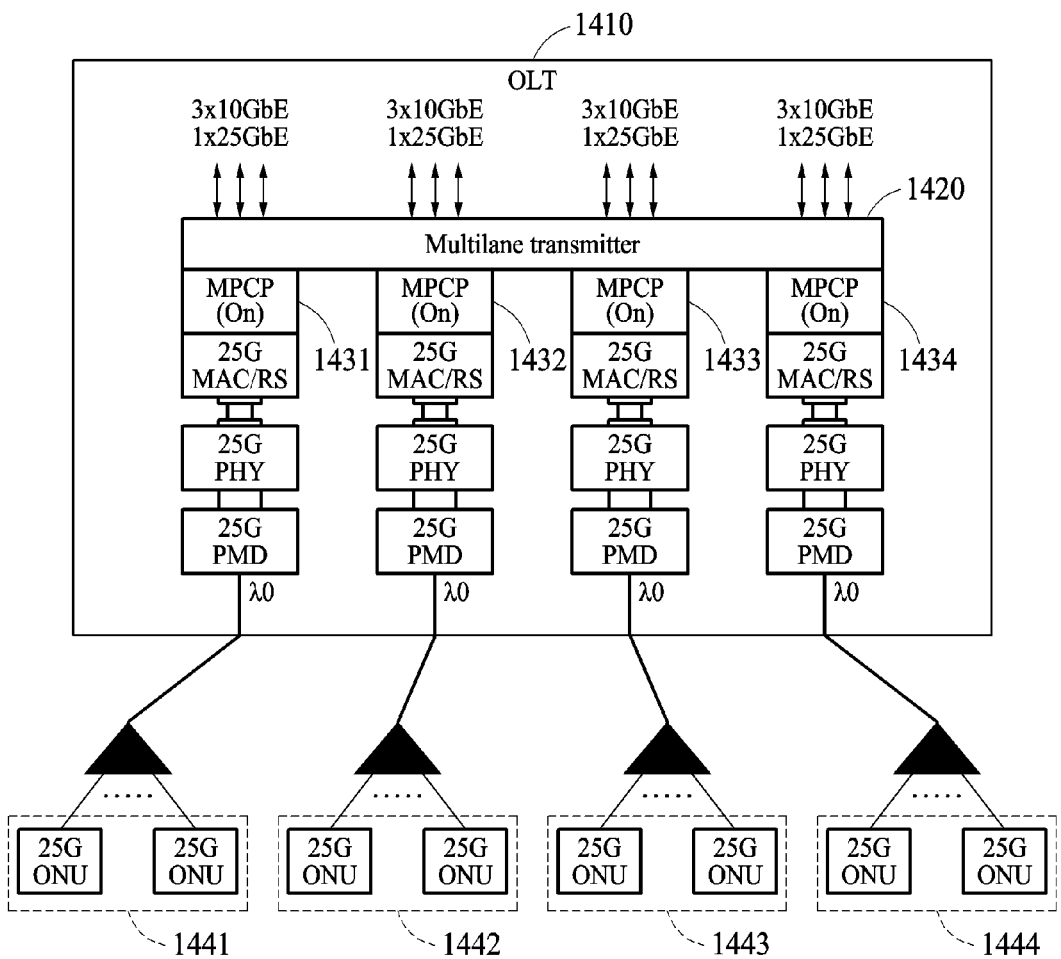
FIG. 14 is a diagram illustrating an example of a connection between an OLT and a plurality of ONUs using a same wavelength and supporting a transmission rate of 25 Gb/s through multiple lanes according to an example embodiment.

FIG. 14 is a diagram illustrating an example of a connection between an OLT 1410 and a plurality of ONUs using a same wavelength and supporting a transmission rate of 25 Gb/s through multiple lanes according to an example embodiment. Referring to FIG. 14, four lanes of the OLT 1410 may use a same wavelength. The OLT 1410 may be connected to different ONUs 1441, 1442, 1443, and 1444 for each lane. An ONU discoverer of the OLT 1410 may include a lane 0 discoverer 1431, a lane 1 discoverer 1432, a lane 2 discoverer 1433, and a lane 3 discoverer 1434 that operate independently for each lane.

As illustrated in FIG. 14, since the OLT 1410 is connected to the different ONUs 1441, 1442, 1443, and 1444 for each lane, the lane 0 discoverer 1431, the lane 1 discoverer 1432, the lane 2 discoverer 1433, and the lane 3 discoverer 1434 may register the different ONUs 1441, 1442, 1443, and 1444. That is, the lane 1 discoverer 1432 may allocate lane 1 only to the ONUs 1442 and register the ONUs 1442, and the lane 2 discoverer 1433 may allocate lane 2 only to the ONUs 1443 and register the ONUs 1443.

Since all the four lanes use the same wavelength, the OLT 1410 may output a downstream dataflow through the multiple lanes using the same wavelength. Each of the ONUs 1441, 1442, 1443, and 1444 may use only one lane, and thus the OLT 1410 may need to register a corresponding ONU for each lane.

Figure 15:
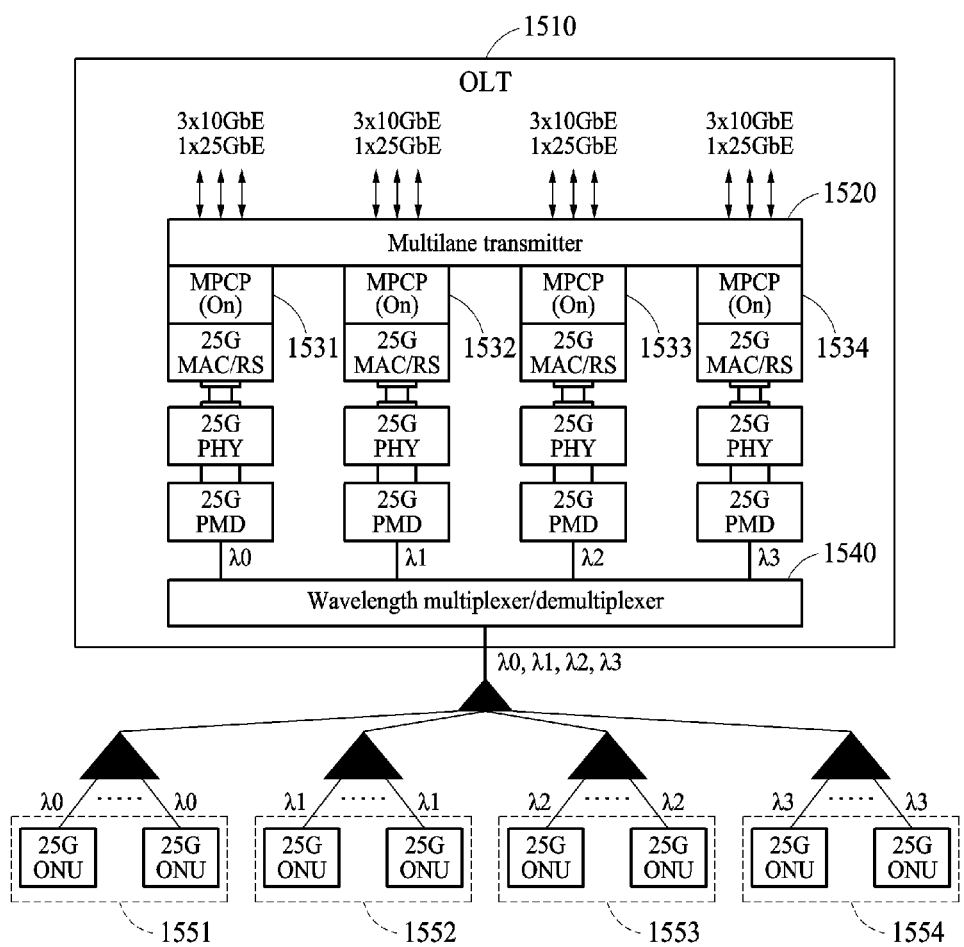
FIG. 15 is a diagram illustrating an example of a connection between an OLT and a plurality of ONUs using different wavelengths and supporting a transmission rate of 25 Gb/s according to an example embodiment.

FIG. 15 is a diagram illustrating an example of a connection between an OLT 1510 and a plurality of ONUs using different wavelengths and supporting a transmission rate of 25 Gb/s according to an example embodiment. Referring to FIG. 15, ONUs 1551, 1552, 1553, and 1554 may use different wavelengths, for example, $\lambda 0$, $\lambda 1$, $\lambda 2$, and $\lambda 3$. That is, the ONUs 1551, 1552, 1553, and 1554 may select one wavelength from the different wavelengths using a fixed optical transceiver or a variable optical transceiver. Here, it is assumed that ONUs using a same wavelength are connected to any one of four lanes of the OLT 1510 through a same port. For example, the OLT 1510 may be connected to the ONUs 1551 using the wavelength of $\lambda 0$ through lane 0, and to the ONUs 1552 using the wavelength of $\lambda 1$ through lane 1.

Referring to FIG. 15, each of the ONUs 1551, 1552, 1553, and 1554 may be discovered and registered by a lane discoverer, for example, a lane 0 discoverer 1531, a lane 1 discoverer 1532, a lane 2 discoverer 1533, and a lane 3 discoverer 1534, of a lane using the same wavelength as the wavelength of each of the ONUs 1551, 1552, 1553, and 1554. That is, among a plurality of ONUs, an ONU may be registered in the OLT 1510 through a lane using the same wavelength as a wavelength used by the ONU. A multilane transmitter 1520 may accommodate, for each lane, a plurality of 10 Gb/s MAC client interfaces or a single 25 Gb/s MAC client interface. Since different wavelengths are used for each lane, the OLT 1510 may include a wavelength multiplexer/demultiplexer 1540. That is, the OLT 1510 may multiplex signals output through the multiple lanes using the different wavelengths and output the multiplexed signals to the ONUs.

Figure 16:
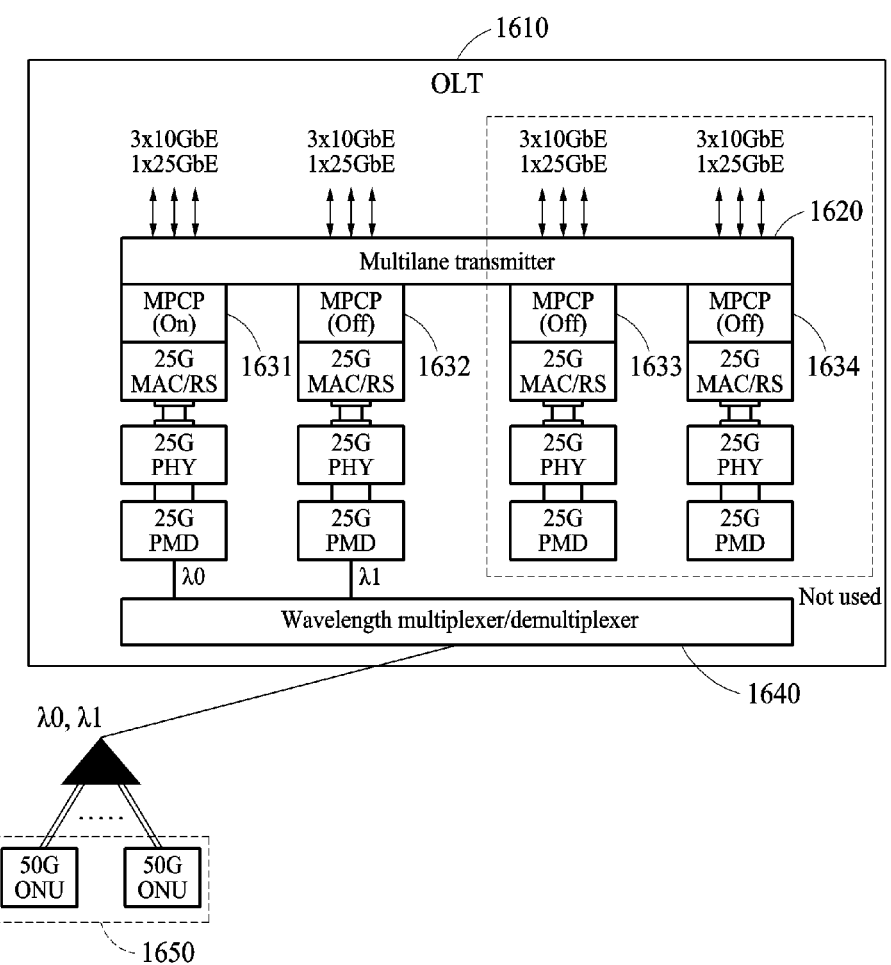
FIG. 16 is a diagram illustrating an example of a connection between an OLT and a plurality of ONUs using a plurality of wavelengths and supporting a transmission rate of 50 Gb/s according to an example embodiment.

FIG. 16 is a diagram illustrating an example of a connection between an OLT 1610 and a plurality of ONUs 1650 using a plurality of wavelengths and supporting a transmission rate of 50 Gb/s according to an example embodiment. Here, to support the transmission rate of 50 Gb/s, the ONUs 1650 may need to use two lanes each supporting a transmission rate of 25 Gb/s. Thus, the ONUs 1650 may be connected to the two lanes using two different wavelengths, for example, $\lambda 0$ and $\lambda 1$.

The OLT 1610 may discover and register the ONUs 1650 through a lane 0 discoverer 1631, a lane 1 discoverer 1632, a lane 2 discoverer 1633, and a lane 3 discoverer 1634. The lane 0 discoverer 1631, the lane 1 discoverer 1632, the lane 2 discoverer 1633, and the lane 3 discoverer 1634 may be activated independently for each lane based on whether an ONU discovery protocol is to be performed. Referring to FIG. 16, only the lane 0 discoverer 1631 of lane 0 using the wavelength of $\lambda 0$ may perform the ONU discovery protocol, and the lane 1 discoverer 1632 of lane 1 using the wavelength of $\lambda 1$ may not perform the ONU discovery protocol. Thus, the ONUs 1650 may be registered in the OLT 1610 while communicating with the lane 0 discoverer 1631 through lane 0 using the wavelength of $\lambda 0$. Since remaining lanes, excluding the lanes using the wavelengths of $\lambda 0$ and $\lambda 1$, are not used, the lane 2 discoverer 1633 and the lane 3 discoverer 1634 may be inactivated. In addition, the lane 0 discoverer 1631 and the lane 1 discoverer 1632 may perform a grant/report process to transmit a MAC frame through the lanes.

A multilane transmitter 1620 may combine and distribute a dataflow transferred through a MAC client interface based on the connection between the OLT 1610 and each of the ONUs 1650 through the two lanes. Since the two activated lanes use the different wavelengths, the OLT 1610 may include a wavelength multiplexer/demultiplexer 1640. The wavelength multiplexer/demultiplexer 1640 may multiplex an optical signal output through the two lanes and transmit the multiplexed optical signal to the ONUs 1650. When the ONUs 1650 multiplex an optical signal with the wavelength of $\lambda 0$ and an optical signal with the wavelength of $\lambda 1$ and transmit the multiplexed optical signals to the OLT 1610, the wavelength multiplexer/demultiplexer 1640 may demultiplex a multiplexed optical signal transferred through a single optical cable.

Figure 17:
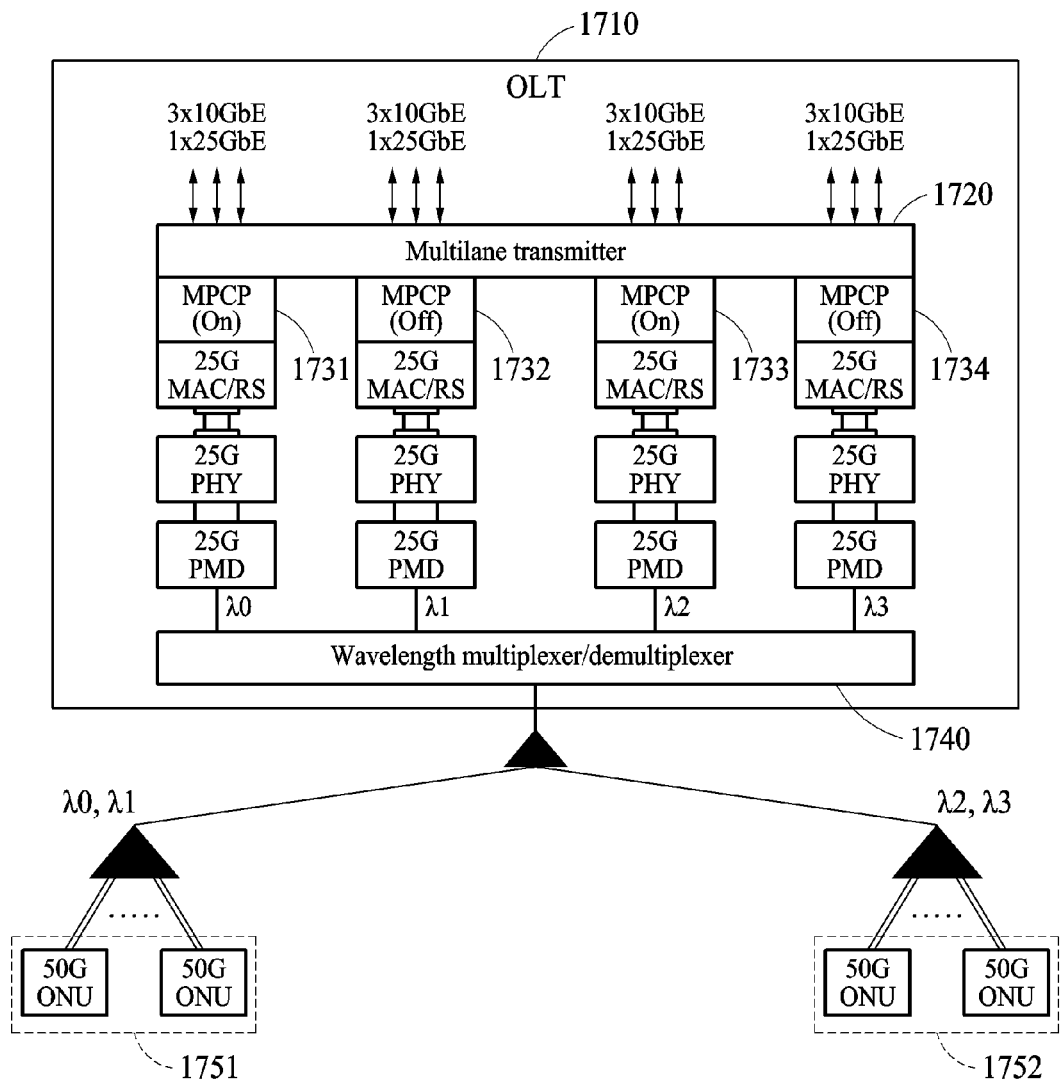
FIG. 17 is a diagram illustrating another example of a connection between an OLT and a plurality of ONUs using a plurality of wavelengths and supporting a transmission rate of 50 Gb/s according to an example embodiment.

FIG. 17 is a diagram illustrating another example of a connection between an OLT 1710 and a plurality of ONUs using a plurality of wavelengths and supporting a transmission rate of 50 Gb/s according to an example embodiment. Referring to FIG. 17, the OLT 1710 may communicate with a plurality of ONUs 1751 and 1752 supporting a transmission rate of 50 Gb/s using four lanes. Each of the four lanes may use different wavelengths, for example, $\lambda 0$, $\lambda 1$, $\lambda 2$, and $\lambda 3$. That is, the ONUs 1751 and 1752 may be connected to the lanes through the different wavelengths.

Referring to FIG. 17, the ONUs 1751 and 1752 supporting the transmission rate of 50 Gb/s may be classified into the ONUs 1751 using wavelengths of $\lambda 0$ and $\lambda 1$, and the ONUs using wavelengths of $\lambda 2$ and $\lambda 3$. The OLT 1710 may be connected to the ONUs 1751 through two lanes using the wavelengths of $\lambda 0$ and $\lambda 1$, and to the ONUs 1752 through two lanes using the wavelengths of $\lambda 2$ and $\lambda 3$.

The ONUs 1751 and 1752 may be registered in the OLT 1710 through any one lane among the lanes to which the ONUs 1751 and 1752 are connected. As illustrated in FIG. 17, a lane 0 discoverer 1731 of lane 0 using the wavelength of $\lambda 0$ and a lane 2 discoverer 1733 of lane 2 using the wavelength of $\lambda 2$ may use an ONU discovery protocol, for example, an MPCP. Thus, the ONUs 1751 may be registered in the OLT 1710 through the lane to which the wavelength of $\lambda 0$ is allocated, and the ONUs 1752 may be registered in the OLT 1710 through the lane to which the wavelength of $\lambda 2$ is allocated. The lane 0 discoverer 1731 and the lane 2 discoverer 1733 may perform a grant/report process to perform a bandwidth allocation.

Referring to FIG. 17, a multilane transmitter 1720 may verify a destination address (DA) of a downstream dataflow transferred through a MAC client interface, and then combine or distribute the downstream dataflow based on a lane used by an ONU corresponding to the verified DA. Since the four lanes use the different wavelengths, the OLT 1710 may include a wavelength multiplexer/demultiplexer 1740 to multiplex a signal output through a lane, and demultiplex a signal transferred from the ONUs 1751 and 1752.

Figure 18:
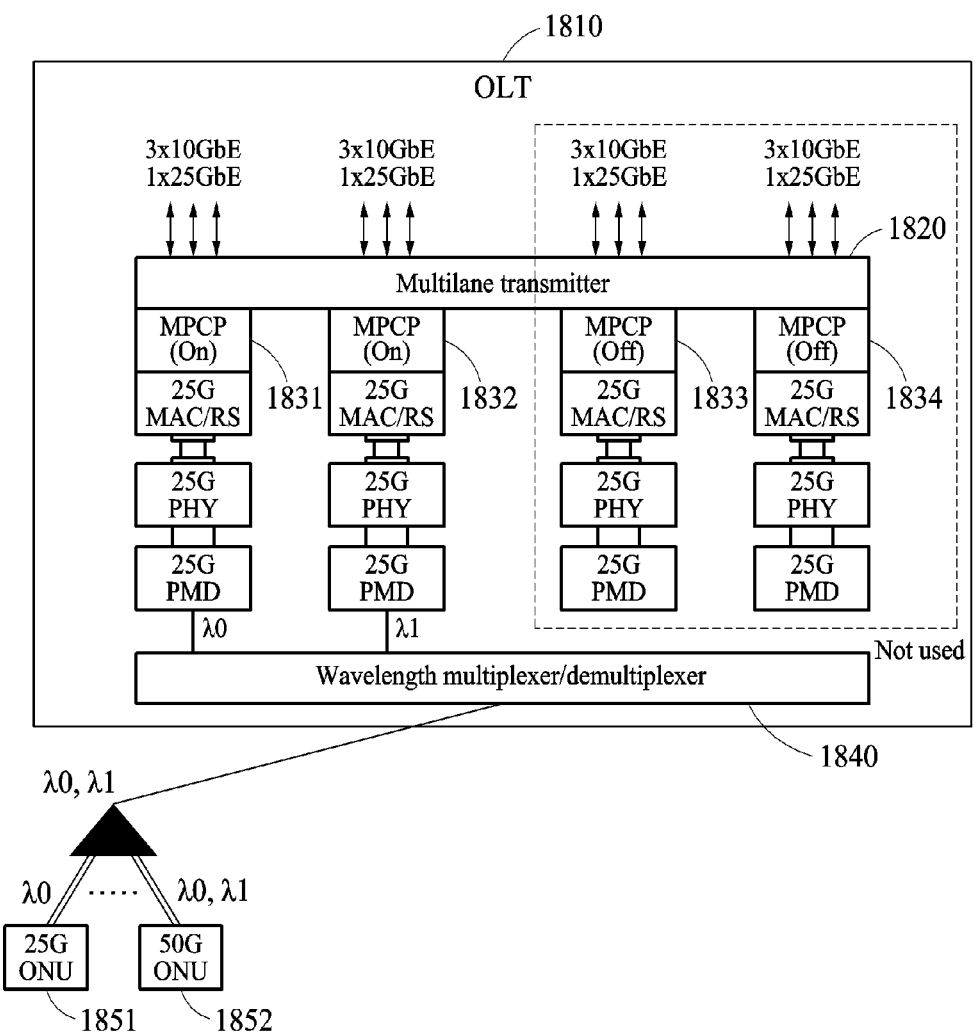
FIG. 18 is a diagram illustrating an example of a connection between an OLT and a plurality of ONUs supporting different wavelengths and different transmission rates according to an example embodiment.

FIG. 18 is a diagram illustrating an example of a connection between an OLT 1810 and a plurality of ONUs 1851 and 1852 supporting different wavelengths and different transmission rates according to an example embodiment. Referring to FIG. 18, the ONU 1851 uses a wavelength of $\lambda 0$ and supports a transmission rate of 25 Gb/s, and the ONU 1852 uses wavelengths of $\lambda 0$ and $\lambda 1$ and supports a transmission rate of 50 Gb/s. Here, lane 0 using the wavelength of $\lambda 0$ and lane 1 using the wavelength of $\lambda 1$ may be used. That is, the OLT 1810 may be connected to the ONUs 1851 and 1852 through lane 0, and to the ONU 1852 through lane 1.

To register the ONU 1851 supporting the transmission rate of 25 Gb/s, the OLT 1810 may perform an ONU discovery protocol using a lane 0 discoverer 1831 of lane 0.

To register the ONU 1852 supporting the transmission rate of 50 Gb/s, the OLT 1810 may perform the ONU discovery protocol using a lane 1 discoverer 1832 of lane 1. That is, the ONU 1852 may communicate with the lane 1 discoverer 1832, and lane 0 and lane 1 may be allocated to the ONU 1852.

The OLT 1810 may register the ONUs that support different transmission rates for each lane. Since only lane 0 and lane 1 are used, a lane 2 discoverer 1833 and a lane 3 discoverer 1834 of remaining lanes, excluding lane 0 and lane 1, may be inactivated.

As illustrated in FIG. 18, the ONUs 1851 and 1852 may be connected to the OLT 1810 through one optical splitter. The OLT 1810 may include a wavelength multiplexer/demultiplexer 1840 to use the two different wavelengths of λ0 and λ1. Although an example of a 25 Gb/s ONU being connected to lane 0 and a 50 Gb/s ONU being connected to lane 1 is illustrated, the OLT 1810 may be connected to the 25 Gb/s ONU and the 50 Gb/s ONU through two other lanes.

Figure 19:
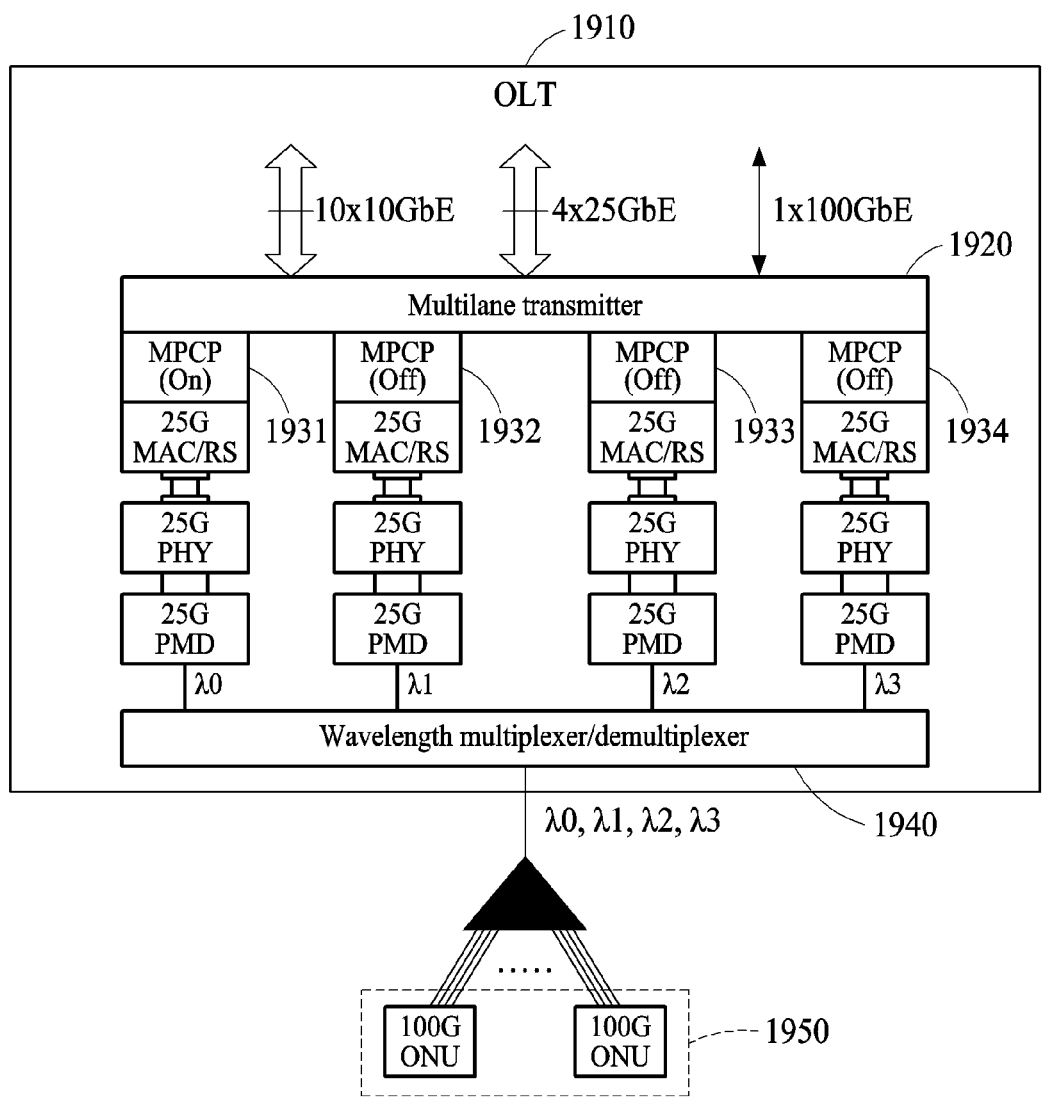
FIG. 19 is a diagram illustrating an example of a connection between an OLT and a plurality of ONUs using a plurality of wavelengths and supporting a transmission rate of 100 Gb/s according to an example embodiment.

FIG. 19 is a diagram illustrating an example of a connection between an OLT 1910 and a plurality of ONUs 1950 using a plurality of wavelengths and supporting a transmission rate of 100 Gb/s according to an example embodiment. Referring to FIG. 19, the ONUs 1950 may support the transmission rate of 100 Gb/s by simultaneously transmitting a MAC frame at a rate of 25 Gb/s through each of four wavelengths λ0, λ1, λ2, and λ3. The OLT 1910 may set, in order, the wavelengths λ0, λ1, λ2, and λ3 used by lane 0, lane 1, lane 2, and lane 3, respectively. Thus, the ONUs 1950 may communicate with the OLT 1910 at the transmission rate of 100 Gb/s by using all the lanes 0 through 3.

The OLT 1910 may discover and register the ONUs 1950 using any one of the lanes 0 through 3. The OLT 1910 may discover and register the ONUs 1950 using an ONU discoverer, for example, a lane 0 discoverer 1931 of lane 0. Thus, a lane 1 discoverer 1932, a lane 2 discoverer 1933, and a lane 3 discoverer 1934 may not perform an ONU discovery protocol. To communicate with the ONUs 1950, the lane 0 discoverer 1931, the lane 1 discoverer 1932, the lane 2 discoverer 1933, and the lane 3 discoverer 1934 may perform a grant/report process.

Referring to FIG. 19, when a downstream dataflow is transferred to a multilane transmitter 1920 at a transmission rate of 10 Gb/s through a MAC client interface, the multilane transmitter 1920 may combine downstream dataflows based on a transmission rate of each lane. When a downstream dataflow is transferred to the multilane transmitter 1920 at a transmission rate of 25 Gb/s through the MAC client interface, the multilane transmitter 1920 may bypass a MAC bridge to transmit the downstream dataflow to a lane.

When a downstream dataflow is transferred to the multilane transmitter 1920 at a transmission rate of 100 Gb/s through the MAC client interface, the multilane transmitter 1920 may distribute the downstream dataflow based on a transmission rate of each lane. In such a case, the four lanes may be bonded, and thus may operate as a single lane having the transmission rate of 100 Gb/s.

Figure 20:
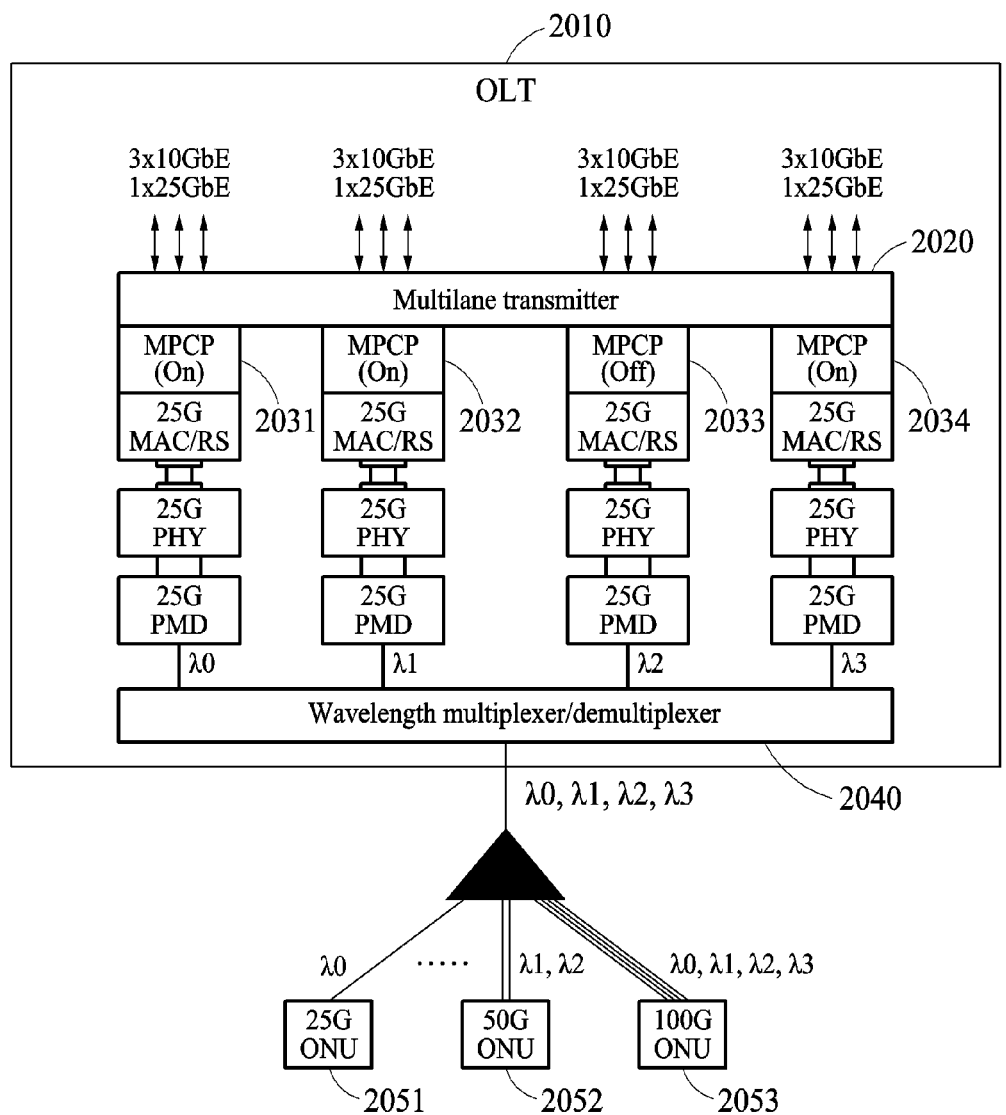
FIG. 20 is a diagram illustrating an example of a connection between an OLT and a plurality of ONUs supporting different transmission rates according to an example embodiment.

FIG. 20 is a diagram illustrating an example of a connection between an OLT 2010 and a plurality of ONUs supporting different transmission rates according to an example embodiment. Referring to FIG. 20, an ONU 2051 supports a transmission rate of 25 Gb/s, an ONU 2052 supports a transmission rate of 50 Gb/s, and an ONU 2053 supports a transmission rate of 100 Gb/s. The ONUs 2051, 2052, and 2053 may be connected to the OLT 2010 through a single optical splitter. The OLT 2010 may be connected to different ONUs supporting various transmission rates through at least one optical splitter.

Referring to FIG. 20, the ONU 2051 supporting the transmission rate of 25 Gb/s may use only a wavelength of λ0, the ONU 2052 supporting the transmission rate of 50 Gb/s may use two different wavelengths of λ1 and λ2, and the ONU 2053 supporting the transmission rate of 100 Gb/s may use four different wavelengths of λ0, λ1, λ2, and λ3. The OLT 2010 may include a wavelength multiplexer/demultiplexer 2040 to communicate with the ONUs using the different wavelengths.

As illustrated in FIG. 20, a multilane transmitter 2020 may combine or distribute a dataflow based on a transmission rate of the dataflow in a MAC client interface and a transmission rate of a lane. Using a DA of a MAC frame transferred through a downstream dataflow, the multilane transmitter 2020 may combine or distribute the downstream dataflow into a lane to which an ONU corresponding to the DA is allocated. For example, when the multilane transmitter 2020 needs to transfer a MAC frame transferred at a transmission rate of 10 Gb/s through a downstream dataflow to an ONU supporting a transmission rate of 25 Gb/s, the multilane transmitter 2020 may combine downstream dataflows into lane 0 through a MAC bridge. Thus, the MAC frame may be output to the ONU 2051 supporting the transmission rate of 25 Gb/s through lane 0.

Based on the wavelengths used by the ONUs 2051, 2052, and 2053, the OLT 2010 may discover and register the ONUs 2051 and 2053 supporting the transmission rates of 25 Gb/s and 100 Gb/s, respectively, through a lane 0 discoverer 2031 of lane 0 using the wavelength of λ0. The OLT 2010 may discover and register the ONU 2052 supporting the transmission rate of 50 Gb/s through a lane 1 discoverer 2032 of lane 1. In addition, the lane 0 discoverer 2031 and the lane 1 discoverer 2032 may perform a grant/report process to allocate a band.

As described above, to perform channel bonding based on a wavelength or a rate supported by an ONU, the OLT 2010 may perform an ONU discovery protocol through the lane 0 discoverer 2031, the lane 1 discoverer 2032, a lane 2 discoverer 2033, and a lane 3 discoverer 2034 that operate independently for each lane. By performing the ONU discovery protocol, the OLT 2010 may detect a wavelength or a rate supported by each ONU and determine a lane to be allocated to each ONU based on the detected wavelength or the rate. The OLT 2010 may use the multilane transmitter 2020 to combine or distribute a downstream dataflow based on a lane allocated to an ONU, or combine or distribute a MAC frame received through a lane into an upstream dataflow.

Figure 21:
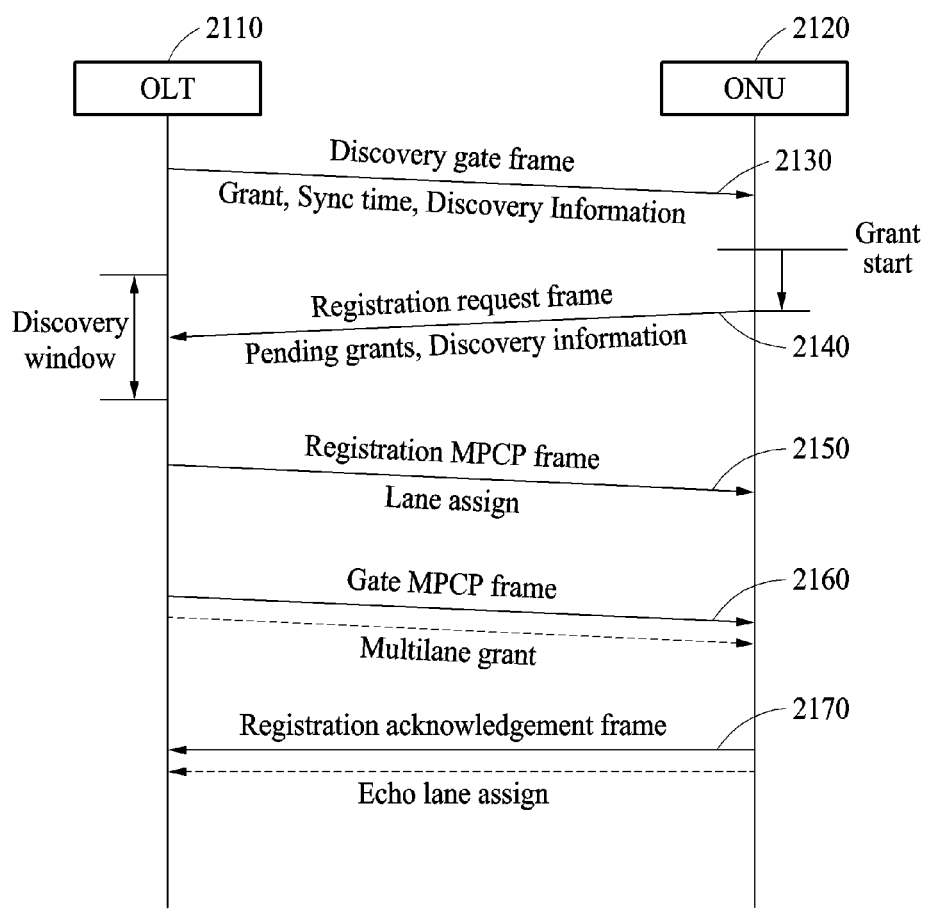
FIG. 21 is a diagram illustrating a flow of a method to be performed by an OLT and an ONU for registration according to an example embodiment.

FIG. 21 is a diagram illustrating a flow of a method to be performed by an OLT 2110 and an ONU 2120 for registration according to an example embodiment. By performing an ONU discovery protocol to be described hereinafter with reference to FIG. 21, a wavelength or a rate supported by the ONU 2120 may be transferred to the OLT 2110, and a lane to be used by the OLT 2110 and the ONU 2120 may be determined.

Referring to FIG. 21, to discover the ONU 2120 that is yet to be registered, the OLT 2110 may transmit, on a periodic basis, a discovery gate frame 2130 including discovery information. The discovery information may include upstream transmission band information that may be received by the OLT 2110, and information on a discovery window open to discover the ONU 2120. The discovery window may refer to a time at which the ONU 2120 transmits a registration request frame 2140 in response to the discovery gate 2130.

The OLT 2110 may record, in a preamble field of the discovery gate frame 2130, a 16-bit logical link identifier (LLID) value of a broadcast type to discover the ONU 2120 supporting a certain rate. For example, when the 16-bit LLID value of the discovery gate frame 2130 is 0x7 FFD, only a 25 Gb/s ONU may be discovered. That is, only the 25 Gb/s ONU may transmit the registration request frame 2140 to the OLT 2110 in response to the discovery gate frame 2130. Similarly, when the 16-bit LLID value is 0x7 FFC, only a 50 Gb/s ONU may be discovered. When the 16-bit LLID value is 0x7 FFB, only a 100 Gb/s ONU may be discovered. To discover all the 25 Gb/s ONU, the 50 Gb/s ONU, and the 100 Gb/s ONU, the OLT 2110 may record a same LLID value in the preamble field of the discovery gate frame 2130.

The discovery gate frame 2130 may include grant information requesting that the ONU 2120 transmits the registration request frame 2140 in response to the discovery gate frame 2130. The OLT 2110 may generate the discovery gate frame 2130 by an MPCP through an ONU discoverer of at least one lane. A structure of the discovery gate frame 2130 generated by the MPCP will be described in detail with reference to FIG. 22.

The ONU 2120 may detect which ONU supporting a certain transmission rate the OLT 2110 desires to discover using an LLID value of the discovery gate frame 2130. The ONU 2120 receiving the discovery gate frame 2130 may request that the OLT 2110 registers the ONU 2120 using the discovery information of the discovery gate frame 2130. The ONU 2120 may request that the OLT 2110 registers the ONU 2120 using the registration request frame 2140. The registration request frame 2140 may include information on a transmission rate supported by the ONU 2120 and information on a transmission rate used by the ONU 2120 for the registration. A structure of the registration request frame 2140 will be described in detail with reference to FIG. 23.

For example, in a case that an LLID value of the discovery gate frame 2130 is a value for a 25 Gb/s ONU, for example, 0x7 FFD, and the OLT 2110 allows a reception of the 25 Gb/s ONU, the ONU 2120 may transmit the registration request frame 2140 to the OLT 2110 when the OLT 2110 opens the discovery window for the 25 Gb/s ONU.

For another example, in a case that an LLID value of the discovery gate frame 2130 is a value for a 50 Gb/s ONU, for example, 0x7 FFC, and the OLT 2110 allows a reception of the 50 Gb/s ONU, the ONU 2120 may transmit the registration request frame 2140 to the OLT 2110 when the OLT 2110 opens the discovery window for the 50 Gb/s ONU.

For still another example, in a case that an LLID value of the discovery gate frame 2130 is a value for a 100 Gb/s ONU, for example, 0x7 FFB, and the OLT 2110 allows a reception of the 100 Gb/s ONU, the ONU 2120 may transmit the registration request frame 2140 to the OLT 2110 when the OLT 2110 opens the discover window for the 100 Gb/s ONU.

For yet another example, in a case that an LLID value of the discovery gate frame 2130 is a value for ONUs with all transmission rates, the ONUs supporting the different transmission rates may transmit the registration request frame 2140 to the OLT 2110 when the OLT 2110 opens the discovery window based on the discovery information of the discovery gate frame 2130.

Referring to FIG. 21, the ONU 2120 may transmit the registration request frame 2140 to the OLT 2110 when the discovery window is opened. The ONU 2120, which is a plurality of ONUs, may transmit the registration request frame 2140 to the OLT 2110 after the discovery window is opened and a delay time elapses. For the registration request frame 2140 to be transmitted before the discovery window is closed, the delay time may be set to be less than or equal to a size of the discovery window.

The OLT 2110 may perceive a transmission rate that is supported by the ONU 2120 through the registration request frame 2140 that is received within the discovery window. For example, in a case that the OLT 2110 opens the discovery window based on the discovery information of the discovery gate frame 2130 to discover a 25 Gb/s ONU, the OLT 2110 may perceive that the ONU 2120 supports a transmission rate of 25 Gb/s when the ONU 2120 transmits the registration request frame 2140 within the discovery window. The OLT 2110 may detect a transmission rate of an ONU by opening different discovery windows for ONUs supporting different transmission rates.

When the OLT 2110 receives the registration request frame 2140, the OLT 2110 may transmit, to the ONU 2120, a registration MPCP frame 2150 including lane allocation information. The registration MPCP frame 2150 may include information on an LLID value to be used by the ONU 2120 and on a lane to be used by the ONU 2120. In response to the registration MPCP frame 2150, the ONU 2120 may set the LLID value of the ONU 2120 and activate the lane. The ONU 2120 may not use a lane that is not allocated. A structure of the registration MPCP frame 2150 will be described in detail with reference to FIG. 24.

The OLT 2110 may transmit, to the ONU 2120, a gate MPCP frame 2160 that requests a transmission of a frame through the activated lane in order to set the LLID value based on the registration MPCP frame 2150 and verify whether the lane is activated. The gate MPCP frame 2160 may include grant information that requests a transmission of a registration acknowledgement frame 2170 through the activated lane.

The OLT 2110 may request that the ONU 2120 transmits the registration acknowledgement frame 2170 through at least one lane through an ONU discoverer that operates independently for each lane. The OLT 2110 may transmit the gate MPCP frame 2160 for each of the ONU 2120, and verify whether a lane is activated for each of the ONU 2160. That is, a preamble field of the gate MPCP frame 2160 may include an LLID value set for each of the ONU 2120.

When the ONU 2120 receives the gate MPCP frame 2160 including the LLID value allocated to the ONU 2120, the ONU 2120 may transmit the registration acknowledgement frame 2170 at a time included in the grant information of the gate MPCP frame 2160. The ONU 2120 may discard the gate MPCP frame 2160 that does not include the LLID value allocated to the ONU 2120. The registration acknowledgement frame 2170 to be transmitted by the ONU 2120 may include information on the LLID value allocated to the ONU 2120 and a lane set by the ONU 2120. A structure of the gate MPCP frame 2160 and a structure of the registration acknowledgement frame 2170 will be described in detail with reference to FIGS. 25 and 26, respectively.

When the information on the LLID value and the lane of the registration acknowledgement frame 2170 corresponds to the information included in the registration MPCP frame 2150, the OLT 2110 may determine that the registration of the ONU 2120 is completed. Thus, the OLT 2110 may determine the lane to be used by the ONU 2120 based on the rate supported by the ONU 2120. When determining the lane to be used by the ONU 2120, the OLT 2110 may consider a lane used by a plurality of ONUs connected to the lane. Thus, the OLT 2110 may use a lane more effectively.

The OLT 2110 may store, in a multilane transmitter, the information on the lane used by the ONU 2120. Thus, the multilane transmitter may determine whether to combine or distribute a downstream dataflow into a lane using the information on the lane used by the ONU 2120. Thus, the OLT 2110 may transmit and receive data based on a transmission rate of each of ONUs supporting various transmission rates.

Figure 22:
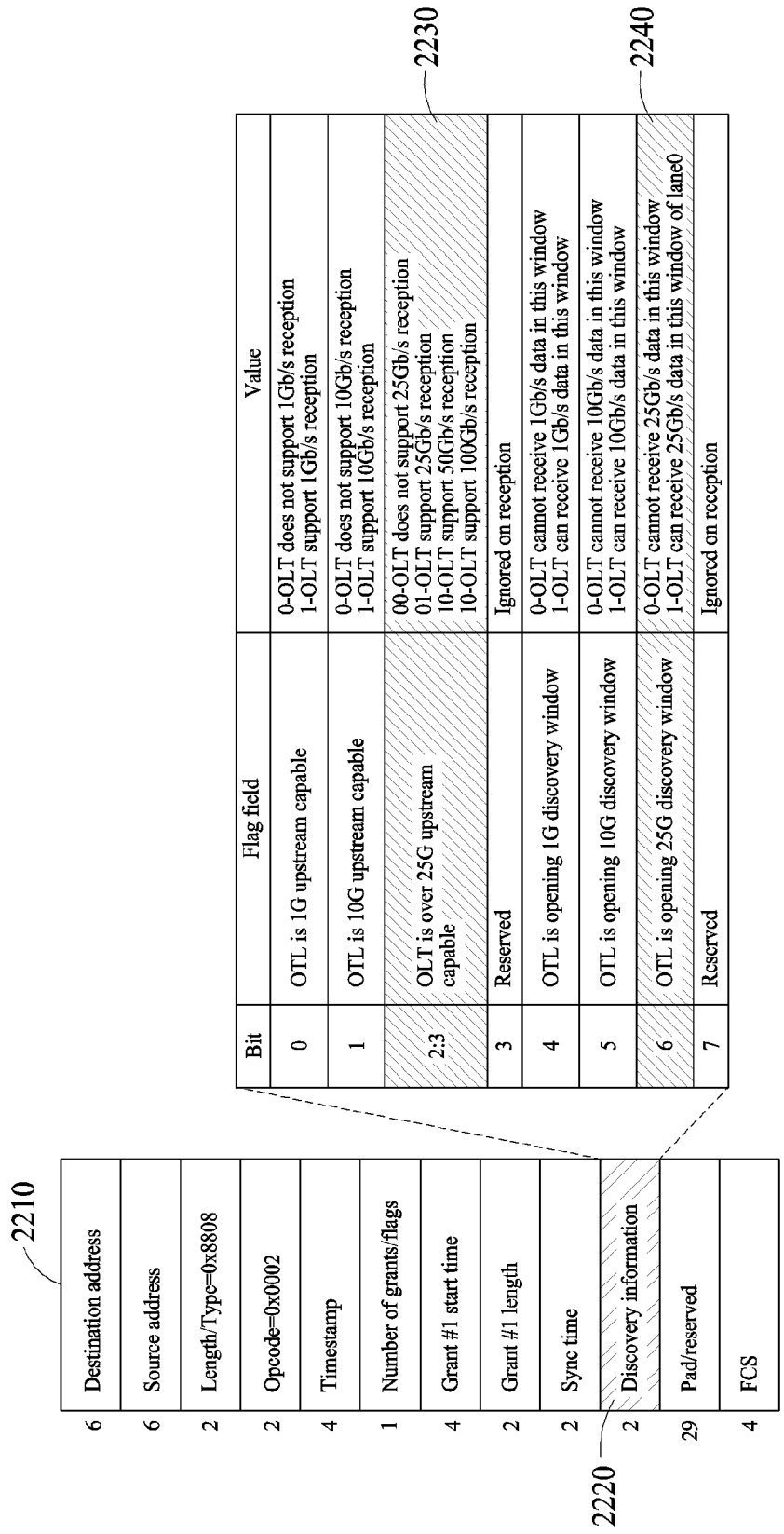
FIG. 22 is a diagram illustrating a structure of a discovery gate frame according to an example embodiment.

FIG. 22 is a diagram illustrating a structure of a discovery gate frame 2210 according to an example embodiment. The discovery gate frame 2210 may be generated by an MPCP protocol.

Referring to FIG. 22, an OLT may record, in a 2-byte discovery information field 2220 of the discovery gate frame 2210, information on an upstream transmission capability of the OLT and a discovery window.

The discovery information field 2220 may include an upstream transmission capability field 2230 in which the upstream transmission capability of the OLT is recorded. The upstream transmission capability field 2230 may use bit [2:3] that is not previously used. The OLT may indicate the upstream transmission capability by recording a preset value in the upstream transmission capability field 2230. As illustrated in FIG. 22, "01" indicates that the OLT supports a 25 Gb/s reception, "10" indicates that the OLT supports a 50 Gb/s reception, and "11" indicates that the OLT supports a 100 Gb/s reception. When the OLT does not support a rate greater than 25 Gb/s, "00" may be recorded in the upstream transmission capability field 2230. An ONU may identify whether the OLT supports 1G-EPON, 10G-EPON, 25G-EPON, 50G-EPON, or 100G-EPON by referring to the upstream transmission capability field 2230.

The discovery information field 2220 may include a discovery window field 2240 in which the information on the discovery window is recorded. Bit [6] of the discovery information field 2220 may be used for the discovery window field 2240. The OLT may indicate whether the OLT performs an ONU discovery protocol at a transmission rate of 25 Gb/s using the discovery information field 2220.

For example, the OLT in 1G-EPON and 100G-EPON may record "0" in the discovery information field 2220. In such an example, an ONU may transmit a registration request fame at a transmission rate of 10 Gb/s in lieu of 25 Gb/s. When the OLT supports a transmission rate of 25 Gb/s, the OLT may record "1" in the discovery information field 2220. Thus, the discovery gate frame 2210 may support a new OLT and ONU of 25G-EPON, 50G-EPON, and 100G-EPON that are compatible with the existing OLT and ONU of 1G-EPON and 10G-EPON.

Figure 23:
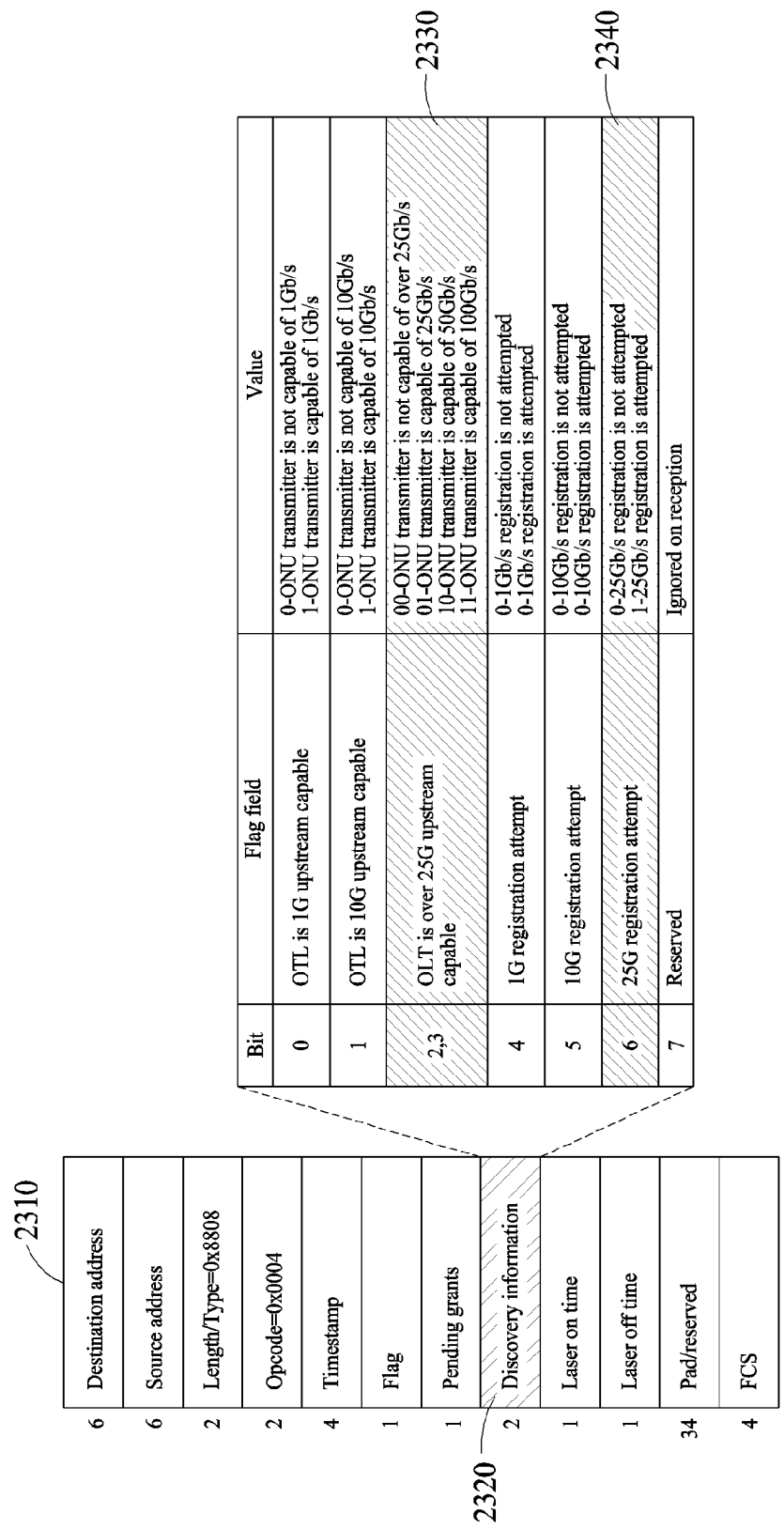
FIG. 23 is a diagram illustrating a structure of a registration request frame according to an example embodiment.

FIG. 23 is a diagram illustrating a structure of a registration request frame 2310 according to an example embodiment. The registration request frame 2310 may be generated by an MPCP protocol.

Referring to FIG. 23, an ONU may record, in a 2-byte discovery information field 2320 of the registration request frame 2310, information on an upstream transmission capability of the ONU and an attempt at registration of the ONU. The 2-byte discovery information field 2320 may include an upstream transmission capability field 2330 indicating the upstream transmission capability of the ONU. The upstream transmission capability field 2330 may use bit [2:3] of the discovery information field 2320.

The ONU may indicate whether the ONU supports an upstream rate greater than or equal to 25 Gb/s using the upstream transmission capability field 2330. Referring to FIG. 23, "00" may indicate that the ONU may not transmit data to an OLT at a transmission rate of 25 Gb/s, and "01" may indicate that the ONU may transmit data to the OLT at a transmission rate of 25 Gb/s. Also, "10" may indicate that the ONU supports 50 Gb/s through two lanes, and "11" may indicate that the ONU supports 100 Gb/s through four lanes. The OLT may identify whether the ONU is a 25 Gb/s ONU, a 50 Gb/s ONU, or a 100 Gb/s ONU using the upstream transmission capability field 2330.

The discovery information field 2320 may include a discovery attempt information field 2340 indicating whether the ONU attempts at the registration at a rate of 25 Gb/s. The discovery attempt information field 2340 may use bit [6] of the discovery information field 2320. When the OLT opens a 10 Gb/s discovery window, the ONU may need to respond at a rate of 10 Gb/s. In such a case, when the ONU does not support the rate of 10 Gb/s, the ONU may not transmit the registration request frame. In addition, when the OLT opens a 25 Gb/s discovery window, the ONU may need to respond only at a rate of 25 Gb/s.

FIG. 24 is a diagram illustrating a structure of a registration MPCP frame 2410 according to an example embodiment. Referring to FIG. 24, an OLT may indicate a lane to be used by an ONU using a 2-bye lane assignment field 2420.

In detail, the lane assignment field 2420 may indicate which lane is to be used by the ONU, using a bitmapping method. Through bit [0] to bit [3], in order, of the lane assignment field 2420, the OLT may indicate whether the OLT assigns lanes 0 through 3 to the ONU. For example, when the OLT assigns lane 2 and lane 3 to the ONU, the OLT may set bit [2] and bit [3] of the lane assignment field 2420 to be 1. The ONU may set to use lane 2 and lane 3 based on the lane assignment field 2420.

In a PON that does not use multiple lanes, all values of the lane assignment field 2420 may be set to be 0. Thus, the structure of the registration MPCP frame 2410 may also be used in existing 1G-EPON and 10G-EPON.

Figure 25:
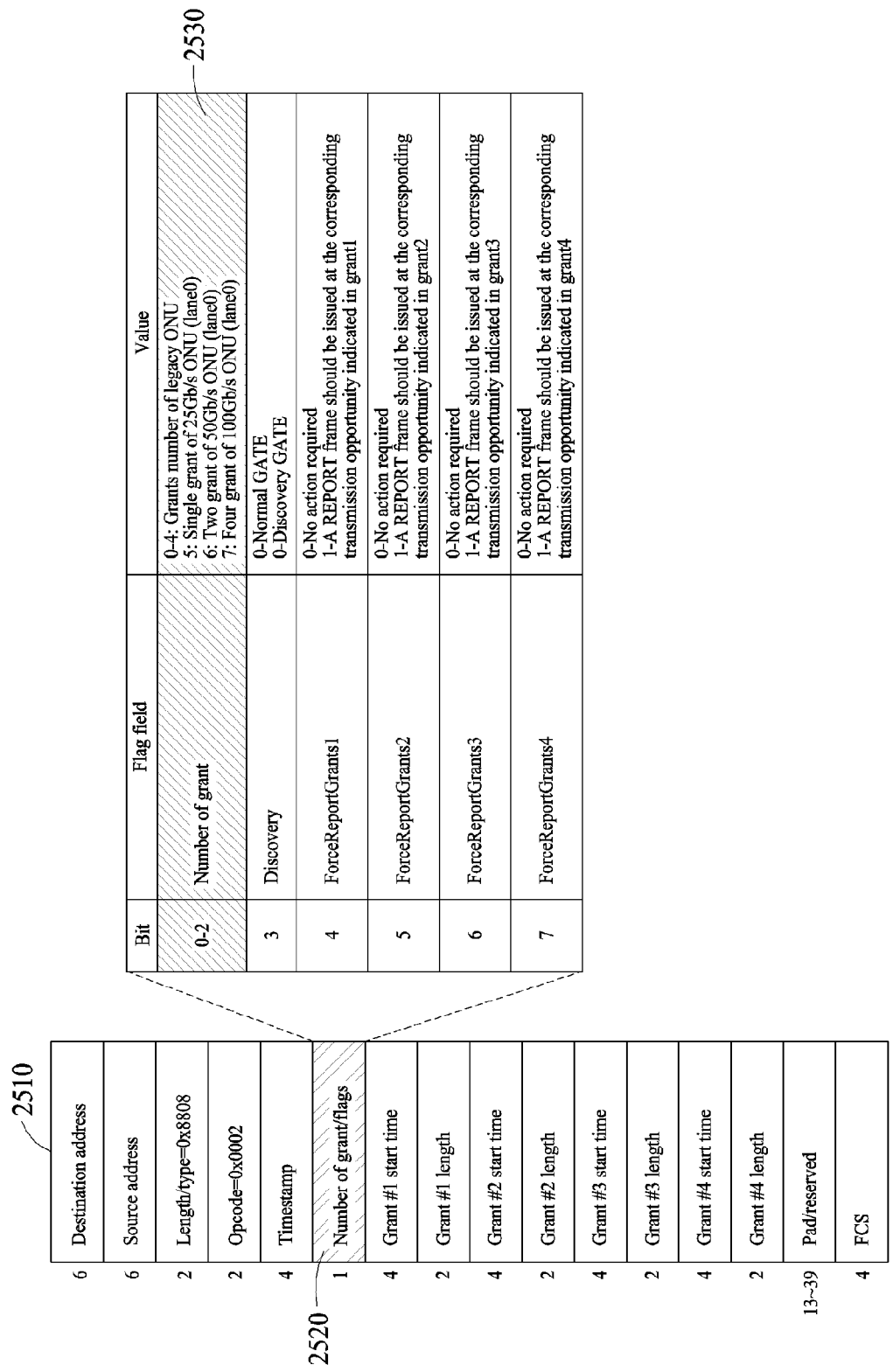
FIG. 25 is a diagram illustrating a structure of a gate MPCP frame according to an example embodiment.

FIG. 25 is a diagram illustrating a structure of a gate MPCP frame 2510 according to an example embodiment. Referring to FIG. 25, the gate MPCP frame 2510 may include a grant/flag field 2520 in which information for allocating a grant based on a transmission rate of an ONU is recorded. A size of the grant/flag field 2520 may be 1 byte. Further, the grant/flag field 2520 may include a grant number field 2530 indicating the number of pieces of grant information included in the gate MPCP frame 2510. The grant number field 2530 may use bit [2:0] of the grant/flag field 2520.

An OLT may indicate that the grant information is not included in the gate MPCP frame 2510 by recording 0 in the grant/flag field 2520. The OLT may also indicate that one piece of the grant information is included in the gate MPCP frame 2510 by recording 1 in the grant/flag field 2520. To maintain a compatibility with existing 1G-EPON and 10G-EPON, the OLT may not use 0 through 4 in the grant/flag field 2520 for a 25G ONU, a 50G ONU, and a 100G ONU.

When the OLT allocates a grant to a 25 Gb/s ONU using only one grant area among four grant areas set in the gate MPCP frame 2510, the OLT may set a value of the grant/flag field 2520 to be 5. When the OLT allocates a grant to a 50 Gb/s ONU using only two grant areas among the four grant areas set in the gate MPCP frame 2510, the OLT may set a value of the grant/flag field 2520 to be 6. When the OLT allocates a grant to a 100 Gb/s ONU using four grant areas among the four grant areas set in the gate MPCP frame 2510, the OLT may set a value of the grant/flag field 2520 to be 7.

In addition, when the OLT does not use grant number information, the OLT may set a discovery flag of bit [3] of the grant/flag field 2520 to be 1.

Figure 26:
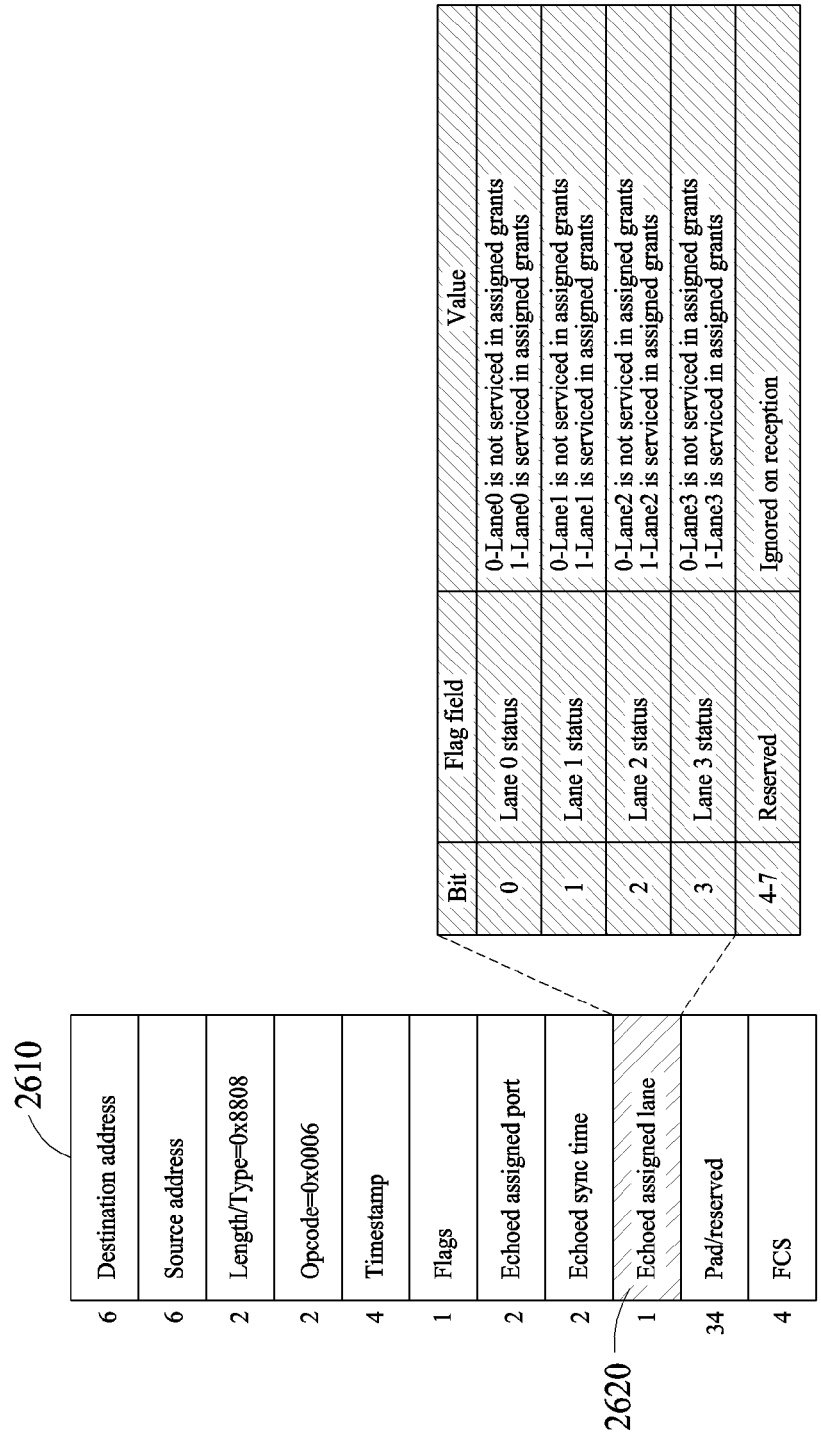
FIG. 26 is a diagram illustrating a structure of a registration acknowledgement frame according to an example embodiment.

FIG. 26 is a diagram illustrating a structure of a registration acknowledgement frame 2610 according to an example embodiment. The registration acknowledgement frame 2610 may be generated by an MPCP protocol.

Referring to FIG. 26, the registration acknowledgement frame 2610 may include an echoed assigned lane field 2620 of a 1 byte size that indicates which lane is assigned to an ONU. Using a bitmapping method, the echoed assigned lane field 2620 may transfer again, to an OLT, a lane assigned by the OLT to the ONU. In an example illustrated in FIG. 26, the ONU may indicate, as 1, bit [2] and bit [3] of the echoed assigned lane field 2620 to indicate that the OLT assigns lane 2 and lane 3 to the ONU.

The OLT may verify whether the ONU is normally registered by comparing the echoed assigned lane field 2620 of the received registration acknowledgement frame 2610 to information on a lane assigned to the ONU. For example, when the OLT assigns lane 2 and lane 3, and bit [2] and bit [3] of the echoed assigned lane field 2620 are 1, the OLT may determine that the ONU is normally registered because a lane assigned by the OLT corresponds to a lane set by the ONU. When the OLT assigns lane 2 and lane 3, and bit [1] and bit [3] of the echoed assigned lane field 2620 are 1, the OLT may determine that the ONU is not normally registered. Thus, the OLT may verify the lane assigned to the ONU.

Figure 27:
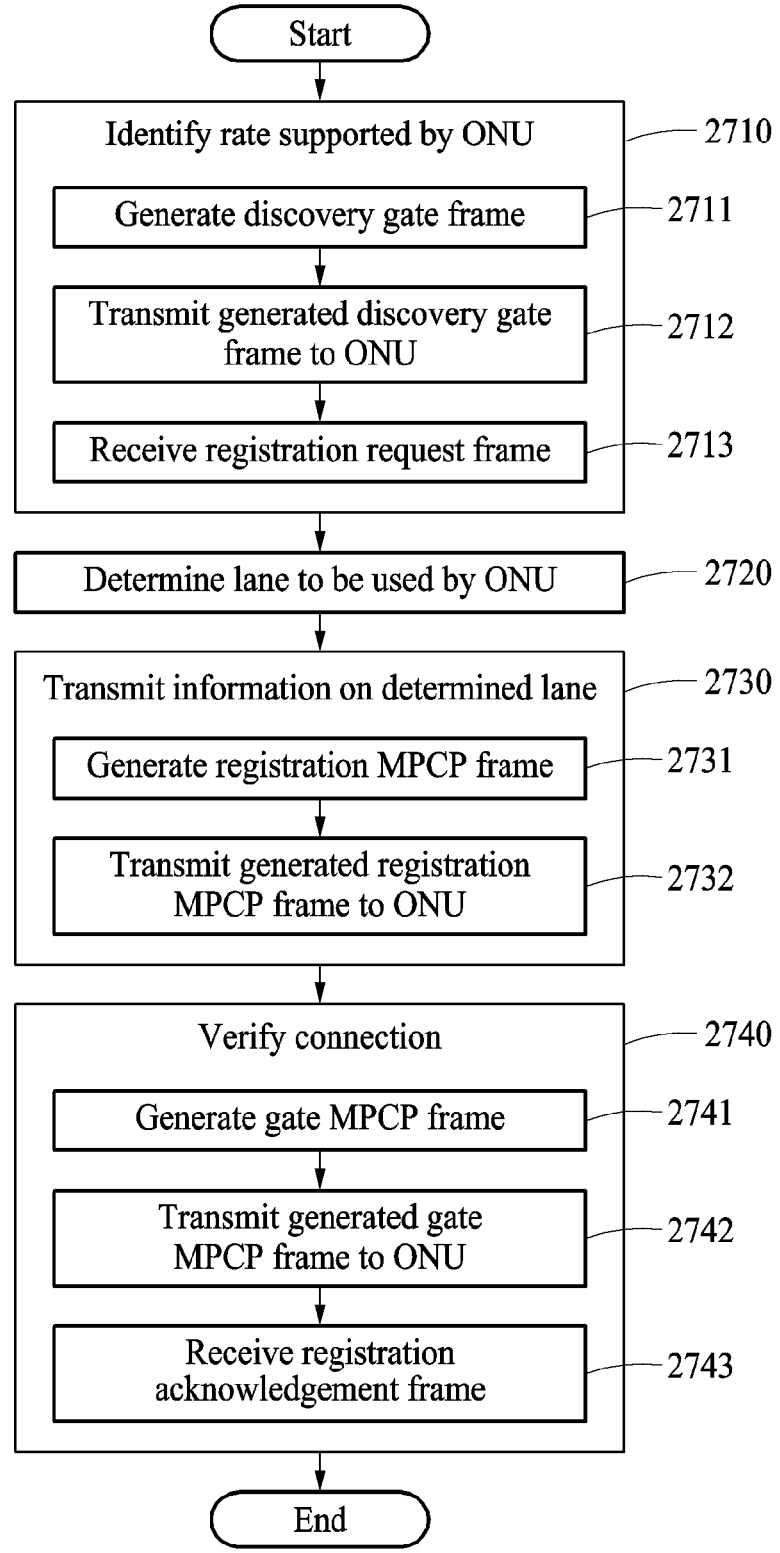
FIG. 27 is a flowchart illustrating a method to be performed by an OLT to register an ONU according to an example embodiment.

FIG. 27 is a flowchart illustrating a method to be performed by an OLT to register an ONU according to an example embodiment. The OLT may perform the method to register the ONU through an ONU discoverer. The ONU discoverer may operate independently for each lane, and the OLT may perform the method only with respect to a certain lane. The OLT may control which lane is to be used to perform the method through a MAC control client interface.

Referring to FIG. 27, in operation 2710, the OLT identifies a rate supported by the ONU using a discovery gate frame. The OLT may transmit the discovery gate frame to the ONU on a periodic basis, and a registered ONU may ignore the discovery gate frame.

In detail, in operation 2711, the OLT generates the discovery gate frame including information on a rate supported by the OLT and on a discovery window in which the ONU transmits a registration request frame. The discovery gate frame may be generated according to an MPCP protocol. The OLT may generate the discovery gate frame through the ONU discoverer that operates for each lane. That is, the discovery gate frame may be generated for each lane.

In operation 2712, the OLT transmits the generated discovery gate frame to the ONU. Here, an ONU that is not registered may receive the discovery gate frame, and identify the discovery window for transmitting the registration request frame. Further, the ONU may identify the transmission rate supported by the OLT through the discovery gate frame.

In the identified discovery window, the ONU may transmit the registration request frame to the OLT. In operation 2713, the OLT receives the registration request frame transmitted from the ONU based on the information on the discovery window. The registration request frame may include the information on the rate supported by the ONU.

In operation 2720, the OLT determines a lane to be used by the ONU based on the rate supported by the ONU. The OLT may determine the lane to be used by the ONU based on a lane assigned to another ONU. A multilane transmitter of the OLT may combine or distribute a dataflow based on the determined lane.

In operation 2730, the OLT transmits, to the ONU, information on the determined lane to assign the determined lane to the ONU. In detail, in operation 2731, the OLT generates a registration MPCP frame indicating the lane to be used by the ONU through a bitmapping method. In operation 2732, when the OLT generates the registration MPCP frame, the OLT transmits the generated registration MPCP frame to the ONU. The ONU may set the lane based on the received registration MPCP frame.

In operation 2740, the OLT verifies whether the ONU is connected to the OLT through the determined lane. Here, operation 2740 may be performed by comparing, to the lane set by the ONU, the information on the determined lane that is used to generate the registration MPCP frame.

In detail, in operation 2741, the OLT generates a gate MPCP frame including grant number information indicating information on a lane of the OLT to which the ONU transmits a registration acknowledgement frame. In operation 2742, when the OLT generates the gate MPCP frame, the OLT transmits the generated gate MPCP frame to the ONU.

The ONU may generate the registration acknowledgement frame based on the grant number information included in the gate MPCP frame. In operation 2743, the OLT receives the registration acknowledgement frame transmitted from the ONU through the lane based on the grant number information. The OLT may verify whether the ONU is connected to the OLT through the determined lane, using information on an assignment of a lane that is included in the registration acknowledgement frame. That is, the OLT may compare the information on the assignment of a lane to the ONU that is included in the registration acknowledgement frame to the information on the determined lane that is used to generate the registration MPCP frame. When the two pieces of the information corresponds to each other, the OLT may determine that the ONU is normally registered.

FIG. 28 is a flowchart illustrating a method to be performed by an ONU to be registered in an OLT according to an example embodiment.

Referring to FIG. 28, in operation 2810, the ONU transmits information on a rate supported by the ONU to the OLT, using a registration request frame. In detail, in operation 2811, the ONU receives, from the OLT, a discovery gate frame including information on a rate supported by the OLT and on a discovery window in which the ONU transmits the registration request frame. In operation 2812, the ONU generates the registration request frame including the information on the rate supported by the ONU. In operation 2813, the ONU transmits the registration request frame to the OLT based on the information on the discovery window. The ONU may use the rate supported by the OLT that is included in the discovery window, and the information on the discovery window in which the ONU transmits the registration request frame.

As described with reference to FIG. 27, the OLT may determine a lane to be used by the ONU based on the rate supported by the ONU that is received, through the registration request frame. Referring to FIG. 28, in operation 2820, the ONU receives, from the OLT, information on the lane to be used by the ONU. The information on the lane may be transmitted to the ONU through a registration MPCP frame. The ONU may set the lane using the registration MPCP frame.

In operation 2830, the ONU verifies whether the ONU is connected to the OLT through the determined lane by communicating with the OLT. In detail, in operation 2831, the ONU receives, from the OLT, a gate MPCP frame including grant number information indicating the information on a lane of the OLT to which the registration acknowledgement frame is to be transmitted. In operation 2832, the ONU generates the registration acknowledgement frame based on the information on the lane to be used. In operation 2833, when the registration acknowledgement frame is generated, the ONU transmits the registration acknowledgement frame to the lane of the OLT using the grant number information.

According to example embodiments, by assigning a lane by an OLT based on a transmission rate supported by an ONU, the OLT may effectively accommodate the ONU. The OLT and the ONU may use a frame structure that may maintain a compatibility with an existing OLT and ONU. The OLT may use a network more effectively by transmitting a dataflow based on a transmission rate supported by a lane.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be split over network coupled computer systems so that the software is stored and executed in a split fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of processing a downstream dataflow to be performed by an optical line terminal (OLT), the method comprising:
    identifying a first transmission rate of at least one downstream dataflow transmitted through a media access control (MAC) client interface;
    bypassing a MAC combiner of a MAC bridge for the downstream dataflow when the first transmission rate of the downstream dataflow is equal to a second transmission rate of multiple lanes of the OLT, wherein the bypassing of the MAC combiner indicates that the MAC combiner is not performed on the downstream dataflow;
    combining the downstream dataflow based on the second transmission rate through the MAC bridge when the first transmission rate of the downstream dataflow is less than the second transmission rate of the lanes of the OLT;

distributing the downstream dataflow based on the second transmission rate through a channel binder when the first transmission rate of the downstream dataflow is greater than the second transmission rate of the lanes of the OLT; and outputting, through the lanes, the downstream dataflow transmitted from the MAC bridge or the channel binder.

2. The method of claim 1, further comprising:

receiving, through the lanes, MAC frames output from an optical network unit (ONU);

bypassing the MAC combiner of the MAC bridge for the MAC frames when the first transmission rate of the downstream dataflow corresponding to the MAC frames is equal to the second transmission rate of the lanes of the OLT;

distributing the MAC frames through the MAC bridge when the first transmission rate of the downstream, dataflow corresponding to the MAC frames is less than the second transmission rate of the lanes of the OLT;

combining the MAC frames through the channel binder when the first transmission rate of the downstream dataflow corresponding to the MAC frames is greater than the second transmission rate of the lanes of the OLT; and outputting, through an upstream dataflow, the MAC frames transmitted from the MAC bridge or the channel binder.

3. The method of claim 2, wherein the distributing of the MAC frames comprises:

determining the upstream dataflow to which each of the MAC frames is to be distributed in order not to exceed a transmission rate of the upstream dataflow that is equal to the first transmission rate of the downstream dataflow; and distributing the MAC frames through the determined upstream dataflow.

4. The method of claim 2, wherein the combining of the MAC frames comprises:

transmitting the MAC frames to a combiner of the channel binder based on a timeslot sequence of the MAC frames stored in a frame buffer corresponding to each of the lanes; and combining the MAC frames through the combiner of the channel binder.

5. The method of claim 1, wherein the combining of the downstream dataflow comprises:

determining a lane to which the downstream dataflow is to be distributed among the lanes based on a destination address; and combining the downstream dataflow based on the determined lane in order not to exceed the second transmission rate.

6. The method of claim 1, wherein the distributing of the downstream dataflow comprises:

determining a frame buffer to which the downstream dataflow is to be distributed based on respective capacities of frame buffers corresponding respectively to the lanes; and distributing the downstream dataflow to the determined frame buffer, and the outputting of the downstream dataflow through the lanes comprises:

outputting the downstream dataflow stored in the frame buffer through a lane corresponding to the frame buffer.

7. The method of claim 6, wherein the determining of the frame buffer comprises:

determining the frame buffer to which the downstream dataflow is to be distributed based on a transmission time of a multipoint control protocol (MPCP) frame to be output through the lane and a delay time due to a parity addition.

8. The method of claim 1, wherein the outputting of the downstream dataflow through the lanes comprises:

outputting the downstream dataflow through the lanes using, a same wavelength, wherein an ONU connected to each of the lanes is registered in the OLT for each lane.

9. The method of claim 1, wherein the outputting of the downstream dataflow through the lanes comprises:

outputting the downstream dataflow to an ONU by multiplexing the downstream dataflow output through the lanes using different wavelengths, wherein the ONU is registered in the OLT through a lane using a same wavelength as a wavelength used by the ONU among the lanes.

10. The method of claim 9, wherein the ONU is connected to the lanes through the different wavelengths, and registered in the OLT through a lane among the lanes to which the ONU is connected.

* * * * *